US012801394B2

(12) United States Patent
Wu et al.

(10) Patent No.: US 12,801,394 B2
(45) Date of Patent: Nov. 17, 2026

(54) EXCEPTION LOCATING METHOD, APPARATUS, AND SYSTEM, AND STORAGE MEDIUM

(71) Applicant: HUAWEI TECHNOLOGIES CO., LTD., Shenzhen (CN)

(72) Inventors: Wei Wu, Wuhan (CN); Jianfeng Wang, Dongguan (CN); Jinhui Wang, Dongguan (CN); Hao Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 18/545,232

(22) Filed: Dec. 19, 2023

(65) Prior Publication Data

US 2024/0143332 A1 May 2, 2024

Related U.S. Application Data

(63) Continuation of application No. PCT/CN2022/090651, filed on Apr. 29, 2022.

(30) Foreign Application Priority Data

Jun. 21, 2021 (CN) ......................... 202110687213.6

(51) Int. Cl.

*H04B 10/00* (2013.01)
*G06F 9/38* (2018.01)
*H04J 14/00* (2006.01)

(52) U.S. Cl.

CPC .................................. *G06F 9/3861* (2013.01)

(58) Field of Classification Search

CPC .... H04B 10/03; H04B 10/032; H04B 10/038; H04B 10/07; H04B 10/0771;

(Continued)

(56) References Cited

U.S. PATENT DOCUMENTS

| | | | | |
|---|---|---|---|---|
| 9,774,392 | B2 | 9/2017 | Doucet et al. | |
| 2008/0304822 | A1* | 12/2008 | Bianchi .............. | H04J 14/0293 398/2 |

(Continued)

FOREIGN PATENT DOCUMENTS

| | | | |
|---|---|---|---|
| CN | 103780305 | A | 5/2014 |
| CN | 106452564 | A | 2/2017 |

(Continued)

*Primary Examiner* — Daniel G Dobson
(74) *Attorney, Agent, or Firm* — WOMBLE BOND DICKINSON (US) LLP

(57) ABSTRACT

This application provides an exception locating method includes: A first device receives a first exception signal which changes abruptly from a first communication signal when the first communication signal passes through a location of an exception on a first line. The first device receives exception alarm information which is sent by the second device after the second device receives a second exception signal, the second exception signal is a signal that changes abruptly from a second communication signal when the second communication signal passes through the location of the exception. The first device determines the location of the exception based on a first time interval, where the first time interval is an interval between time at which the first exception signal is received and time at which the exception alarm information is received.

20 Claims, 10 Drawing Sheets

(58) Field of Classification Search
CPC ............... H04B 10/079; H04B 10/0791; H04J 14/0267; H04J 14/0268; H04J 14/0287; H04J 14/0293; H04J 14/0297
See application file for complete search history.

(56) References Cited

U.S. PATENT DOCUMENTS

| | | | | |
|---|---|---|---|---|
| 2012/0224846 | A1 | 9/2012 | Swanson et al. | |
| 2014/0133845 | A1 | 5/2014 | Dahlfort et al. | |
| 2014/0205279 | A1 | 7/2014 | Lee et al. | |
| 2018/0351686 | A1* | 12/2018 | Busi ...................... | H04J 3/1652 |

FOREIGN PATENT DOCUMENTS

| | | | |
|---|---|---|---|
| JP | H08125607 | A | 5/1996 |
| JP | 2001136110 | A | 5/2001 |
| JP | 2020174319 | A | 10/2020 |

* cited by examiner

EXCEPTION LOCATING METHOD, APPARATUS, AND SYSTEM, AND STORAGE MEDIUM

CROSS-REFERENCE TO RELATED APPLICATIONS

This application is a continuation of International Application No. PCT/CN2022/090651 filed on Apr. 29, 2022, which claims priority to Chinese Patent Application No. 202110687213.6 filed on Jun. 21, 2021. The disclosures of the aforementioned applications are hereby incorporated by reference in their entireties.

TECHNICAL FIELD

This application relates to the communication field, and in particular, to an exception locating method, apparatus, and system, and a storage medium.

BACKGROUND

In a communication network, any two adjacent network devices are connected through a line such as an optical fiber, but the line is easily affected by an external factor, causing an exception occurred on the line. When an exception occurs on the line, the exception affects quality of a communication signal transmitted on the line, and consequently, the communication signal changes to an exception communication signal. A network device receiving the exception communication signal causes a bit error.

When an exception occurs on the line, a location of the exception needs to be located, so that the line can be repaired. However, currently, when an exception occurs on a line connecting two network devices, a location of the exception is located in a manual manner. The manual manner is time-consuming and laborious, and easily causes missing detection of the exception that occurs.

SUMMARY

This application provides an exception locating method, apparatus, and system, and a storage medium, to improve exception locating efficiency and avoid missing detection of an exception that occurs. Technical solutions are as follows.

According to a first aspect, this application provides an exception locating method. In the method, a first device receives a first exception signal. The first exception signal is a signal that changes abruptly from a first communication signal when the first communication signal passes through a location of an exception on a first line, the first line is a line between the first device and a second device, and the first communication signal is a signal sent by the second device to the first device through the first line. The first device receives exception alarm information. The exception alarm information is sent by the second device after the second device receives a second exception signal, the second exception signal is a signal that changes abruptly from a second communication signal when the second communication signal passes through the location of the exception, and the second communication signal is a signal sent by the first device to the second device through the first line. The first device determines the location of the exception based on a first time interval. The first time interval is an interval between time at which the first exception signal is received and time at which the exception alarm information is received.

The first device receives the first exception signal, and the second device sends the exception alarm information to the first device after receiving the second exception signal. In this way, the first device receives the exception alarm information, obtains the first time interval, and determines the location of the exception based on the first time interval, to quickly determine the location of the exception. This improves exception locating efficiency. When an exception occurs on the first line, the first device receives the first exception signal, and the second device receives the second exception signal. Therefore, when an exception occurs, a location of the exception can be located, to avoid missing detection of the exception that occurs.

In addition, both the time at which the first exception signal is received and the time at which the exception alarm information is received are local time of the first device, and the first time interval is the interval between the two time. Therefore, time synchronization does not need to be performed between the first device and the second device.

In addition, if a loopback device is used to locate an exception, a locating process is as follows. If a loopback device is disposed on the first line between the first device and the second device, the first device needs to establish a first link, a second link, and a third link on the first line. The first link and the second link are links between the first device and the second device. The first link is used to transmit a communication signal sent by the first device to the second device, the second link is used to transmit a communication signal sent by the second device to the first device, and the third link is a link between the first device and the loopback device. When an exception occurs on a line between the first device and the loopback device, the loopback device receives the second exception signal, and sends the second exception signal to the first device through the third link. In this way, the first device receives the first exception signal and the second exception signal, and locates the exception based on the first exception signal and the second exception signal. When an exception occurs on a line between the second device and the loopback device, the second device locates the exception in the same way as the first device. However, in this application, the second device sends the exception alarm information to the first device, to indicate the second exception signal. Therefore, a loopback device does not need to be separately disposed on the first line between the first device and the second device. This saves costs. In addition, this saves a network resource consumed by separately establishing the third link between the first device and the loopback device, and saves a network resource consumed by separately establishing the third link between the second device and the loopback device.

In an embodiment, the first device determines the location of the exception based on a second time interval and the first time interval. The second time interval indicates an interval between time at which the second device receives the second exception signal and time at which the second device sends the exception alarm information. Because the exception is located based on the second time interval, exception locating precision is improved.

In an embodiment, the first device determines the location of the exception based on a device internal delay, the first time interval, and the second time interval. The device internal delay includes a delay required by the first device to receive the first exception signal, a delay required by the second device to receive the second exception signal, a delay required by the second device to send the exception alarm information, and a delay required by the first device to receive the exception alarm information. Because the exception is located based on the device internal delay and the second time interval, the exception locating precision is greatly improved.

In an embodiment, the first device includes a first clock counter, the second device includes a second clock counter, and the first device is a secondary device of the second device. The first device adjusts timing frequency of the first clock counter based on a third communication signal, to enable the timing frequency of the first clock counter to be synchronized with timing frequency of the second clock counter. The third communication signal is sent by the second device based on a working clock of the second clock counter. Because the timing frequency of the first clock counter is synchronized with the timing frequency of the second clock counter, precision of obtaining the second time interval can be improved, to improve the exception locating precision.

In an embodiment, the first device determines a primary/secondary relationship between the first device and the second device based on device information of the first device and device information of the second device. A primary device determined based on device information is usually a device with high hardware performance, and timing frequency of a clock counter of the primary device is usually stable. Therefore, synchronizing timing frequency of a clock counter of a secondary device with the timing frequency of the clock counter of the primary device can improve precision of obtaining a time interval.

In an embodiment, the second time interval is a specified time interval. In this way, the first device does not need the second device to provide the second time interval, and directly uses the specified time interval as the second time interval. This simplifies exception locating complexity.

In an embodiment, the first device includes the first clock counter. The first device calculates the first time interval based on a first count value, a second count value, and the timing frequency of the first clock counter. The first count value is a count value of the first clock counter when the first device receives the first exception signal, and the second count value is a count value of the first clock counter when the first device receives the exception alarm information.

In an embodiment, the first device receives delay information sent by the second device. The delay information indicates the second time interval. The first device calculates the second time interval based on the delay information.

In an embodiment, the second device includes the second clock counter, and the delay information includes a third count value and a fourth count value, the delay information includes a difference between a third count value and a fourth count value, or the delay information includes the second time interval. The third count value is a count value of the second clock counter when the second device receives the second exception signal, the fourth count value is a count value of the second clock counter when the second device sends the exception alarm information, and the second time interval is obtained based on the third count value, the fourth count value, and the timing frequency of the second clock counter.

In an embodiment, the first device receives a first packet sent by the second device, and a reserved field of the first packet includes the exception alarm information. In this way, the exception alarm information does not occupy a resource of a service, to avoid affecting the service.

In an embodiment, the first device receives a code stream sent by the second device, and an idle field of the code stream includes the exception alarm information. In this way, the exception alarm information does not occupy a resource of a service, to avoid affecting the service.

In an embodiment, the first device receives a signal from the first line, and when detecting that a performance parameter value of the signal exceeds a specified threshold, the first device determines that the signal is the first exception signal. In this way, the first exception signal can be accurately detected based on the performance parameter value of the signal.

In an embodiment, a performance parameter of the signal includes at least one of the following: signal power, a signal-to-noise ratio SNR, a polarization-dependent loss PDL, a bit error rate BER, a packet loss rate, and a state of polarization SOP value of the signal.

According to a second aspect, this application provides an exception locating method. In the method, a second device receives a second exception signal. The second exception signal is a signal that changes abruptly from a second communication signal when the second communication signal passes through a location of an exception on a first line, the first line is a line between a first device and the second device, and the second communication signal is a signal sent by the first device to the second device through the first line. The second device sends exception alarm information to the first device. The exception alarm information alarms about the second exception signal, and the exception alarm information is further used to trigger the first device to determine the location of the exception.

The second device sends the exception alarm information to the first device after receiving the second exception signal. In this way, the first device receives the exception alarm information, obtains a first time interval, and determines the location of the exception based on the first time interval, to quickly determine the location of the exception. This improves exception locating efficiency. When an exception occurs on the first line, the second device receives the second exception signal and sends the exception alarm information to the first device, so that the first device performs exception locating. Therefore, when an exception occurs, a location of the exception can be located, to avoid missing detection of the exception that occurs.

In an embodiment, the first device includes a first clock counter, the second device includes a second clock counter, and the second device is a secondary device of the first device. The second device adjusts timing frequency of the second clock counter based on a fourth communication signal, to enable the timing frequency of the second clock counter to be synchronized with timing frequency of the first clock counter. The fourth communication signal is sent by the first device based on a working clock of the first clock counter. Because the timing frequency of the first clock counter is synchronized with the timing frequency of the second clock counter, precision of obtaining a second time interval can be improved, to improve exception locating precision.

In an embodiment, the second device determines a primary/secondary relationship between the first device and the second device based on device information of the first device and device information of the second device. A primary device determined based on device information is usually a device with high hardware performance, and timing frequency of a clock counter of the primary device is usually stable. Therefore, synchronizing timing frequency of a clock counter of a secondary device with the timing frequency of the clock counter of the primary device can improve precision of obtaining a time interval.

In an embodiment, the second device sends delay information to the first device. The delay information indicates the second time interval, and the second time interval indicates an interval between time at which the second device receives the second exception signal and time at which the second device sends the exception alarm information. Therefore, the first device can obtain the second time interval based on the delay information.

In an embodiment, the second device includes the second clock counter, and the delay information includes a third count value and a fourth count value, the delay information includes a difference between a third count value and a fourth count value, or the delay information includes the second time interval. The third count value is a count value of the second clock counter when the second device receives the second exception signal, the fourth count value is a count value of the second clock counter when the second device sends the exception alarm information, and the second time interval is obtained based on the third count value, the fourth count value, and the timing frequency of the second clock counter.

In an embodiment, the interval between the time at which the second device receives the second exception signal and the time at which the second device sends the exception alarm information is a specified time interval. In this way, the first device does not need the second device to provide the second time interval, and directly uses the specified time interval as the second time interval. This simplifies exception locating complexity.

In an embodiment, the second device sends a first packet to the first device, and a reserved field of the first packet includes the exception alarm information. In this way, the exception alarm information does not occupy a resource of a service, to avoid affecting the service.

In an embodiment, the second device sends a code stream to the first device, and an idle field of the code stream includes the exception alarm information. In this way, the exception alarm information does not occupy a resource of a service, to avoid affecting the service.

In an embodiment, the second device adds the exception alarm information to an idle field of at least one to-be-sent code stream frame. The code stream includes the at least one code stream frame.

In an embodiment, the second device receives a signal from the first line. When detecting that a performance parameter value of the signal exceeds a specified threshold, the second device determines that the signal is the second exception signal.

In an embodiment, a performance parameter of the signal includes at least one of the following: signal power, a signal-to-noise ratio SNR, a polarization-dependent loss PDL, a bit error rate BER, a packet loss rate, and a state of polarization SOP value of the signal.

According to a third aspect, this application provides an exception locating method. In the method, a first device sends a second communication signal to a second device through a first line. The first line is a line between the first device and the second device. The second device sends a first communication signal to the first device through the first line. The first device receives a first exception signal. The first exception signal is a signal that changes abruptly from the first communication signal when the first communication signal passes through a location of an exception on the first line. The second device receives a second exception signal. The second exception signal is a signal that changes abruptly from the second communication signal when the second communication signal passes through the location of the exception. The second device sends exception alarm information to the first device. The exception alarm information indicates the second exception signal. The first device receives the exception alarm information. The first device determines the location of the exception based on a first time interval. The first time interval is an interval between time at which the first device receives the first exception signal and time at which the first device receives the exception alarm information.

The first device receives the first exception signal, and the second device sends the exception alarm information to the first device after receiving the second exception signal. In this way, the first device receives the exception alarm information, obtains the first time interval, and determines the location of the exception based on the first time interval, to quickly determine the location of the exception. This improves exception locating efficiency. When an exception occurs on the first line, the first device receives the first exception signal, and the second device receives the second exception signal. Therefore, when an exception occurs, a location of the exception can be located, to avoid missing detection of the exception that occurs.

In addition, both time at which the first exception signal is received and time at which the exception alarm information is received are local time of the first device, and the first time interval is the interval between the two time. Therefore, time synchronization does not need to be performed between the first device and the second device.

If a loopback device is used to locate an exception, a locating process is as follows. If a loopback device is disposed on the first line between the first device and the second device, the first device needs to establish a first link, a second link, and a third link on the first line. The first link and the second link are links between the first device and the second device. The first link is used to transmit a communication signal sent by the first device to the second device, the second link is used to transmit a communication signal sent by the second device to the first device, and the third link is a link between the first device and the loopback device. When an exception occurs on a line between the first device and the loopback device, the loopback device receives the second exception signal, and sends the second exception signal to the first device through the third link. In this way, the first device receives the first exception signal and the second exception signal, and locates the exception based on the first exception signal and the second exception signal. When an exception occurs on a line between the second device and the loopback device, the second device locates the exception in the same way as the first device. However, in this application, the second device sends the exception alarm information to the first device, to indicate the second exception signal. Therefore, a loopback device does not need to be separately disposed on the first line between the first device and the second device. This saves costs. In addition, this saves a network resource consumed by separately establishing the third link between the first device and the loopback device, and saves a network resource consumed by separately establishing the third link between the second device and the loopback device.

According to a fourth aspect, this application provides an exception locating apparatus, configured to perform the method in any one of the first aspect or the possible implementations of the first aspect. Specifically, the apparatus includes a unit configured to perform the method according to any one of the first aspect or the possible implementations of the first aspect.

According to a fifth aspect, this application provides an exception locating apparatus, configured to perform the method in any one of the second aspect or the possible implementations of the second aspect. Specifically, the apparatus includes a unit configured to perform the method according to any one of the second aspect or the possible implementations of the second aspect.

According to a sixth aspect, this application provides an exception locating apparatus. The apparatus includes a processor and a memory. The processor and the memory may be connected through an internal connection. The memory is configured to store a program, and the processor is configured to execute the program in the memory, to enable the apparatus to complete the method according to any one of the first aspect or the possible implementations of the first aspect.

According to a seventh aspect, this application provides an exception locating apparatus. The apparatus includes a processor and a memory. The processor and the memory may be connected through an internal connection. The memory is configured to store a program, and the processor is configured to execute the program in the memory, to enable the apparatus to complete the method according to any one of the second aspect or the possible implementations of the second aspect.

According to an eighth aspect, this application provides a computer program product. The computer program product includes a computer program stored in a computer-readable storage medium, and the computer program is loaded by a processor to implement the method according to any one of the first aspect, the second aspect, the possible implementations of the first aspect, or the possible implementations of the second aspect.

According to a ninth aspect, this application provides a computer-readable storage medium, configured to store a computer program. The computer program is loaded by a processor to perform the method according to any one of the first aspect, the second aspect, the possible implementations of the first aspect, or the possible implementations of the second aspect.

According to a tenth aspect, this application provides a chip, including a memory and a processor. The memory is configured to store computer instructions, and the processor is configured to invoke the computer instructions from the memory and run the computer instructions, to perform the method according to any one of the first aspect, the second aspect, the possible implementations of the first aspect, or the possible implementations of the second aspect.

According to an eleventh aspect, this application provides an exception locating system. The system includes the apparatus according to the fourth aspect and the apparatus according to the fifth aspect; or the system includes the apparatus according to the sixth aspect and the apparatus according to the seventh aspect.

DESCRIPTION OF EMBODIMENTS

The following further describes in detail embodiments of this application with reference to accompanying drawings.

Figure 1:
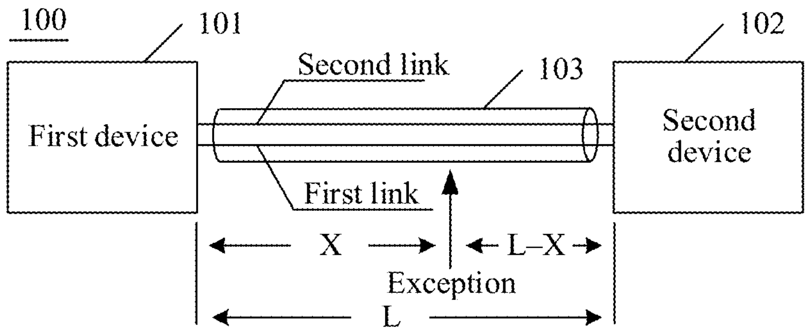
FIG. 1 is a schematic diagram of a network architecture according to an embodiment of this application.

Refer to FIG. 1. An embodiment of this application provides a network architecture 100, including:

a first device 101 and a second device 102, the first device 101 and the second device 102 are connected through a first line 103, and the first device 101 communicates with the second device 102 through the first line 103.

For example, the second device 102 sends a first communication signal to the first device 101 through the first line 103, and the first device 101 receives the first communication signal, and/or the first device 101 sends a second communication signal to the second device 102 through the first line 103, and the second device 102 receives the second communication signal.

In some embodiments, the first device 101 and the second device 102 establish a first link and a second link on the first line 103. The second device 102 sends the first communication signal to the first device 101 through the first link, and the first device 101 sends the second communication signal to the second device 102 through the second link.

The first device 101 and the second device 102 are two network devices in a communication network. For example, the first device 101 and/or the second device 102 may include a router, a switch, and/or a base station.

The first line 103 may be an optical fiber, a cable, or the like.

The first device 101 includes a first clock counter and/or a first clock, and the second device 102 includes a second clock counter and/or a second clock.

The first clock counter is for counting. When sending the second communication signal to the second device 102, the first device 101 obtains a working clock of the first clock counter, and sends the second communication signal to the second device 102 based on the working clock of the first clock counter.

Figure 2:
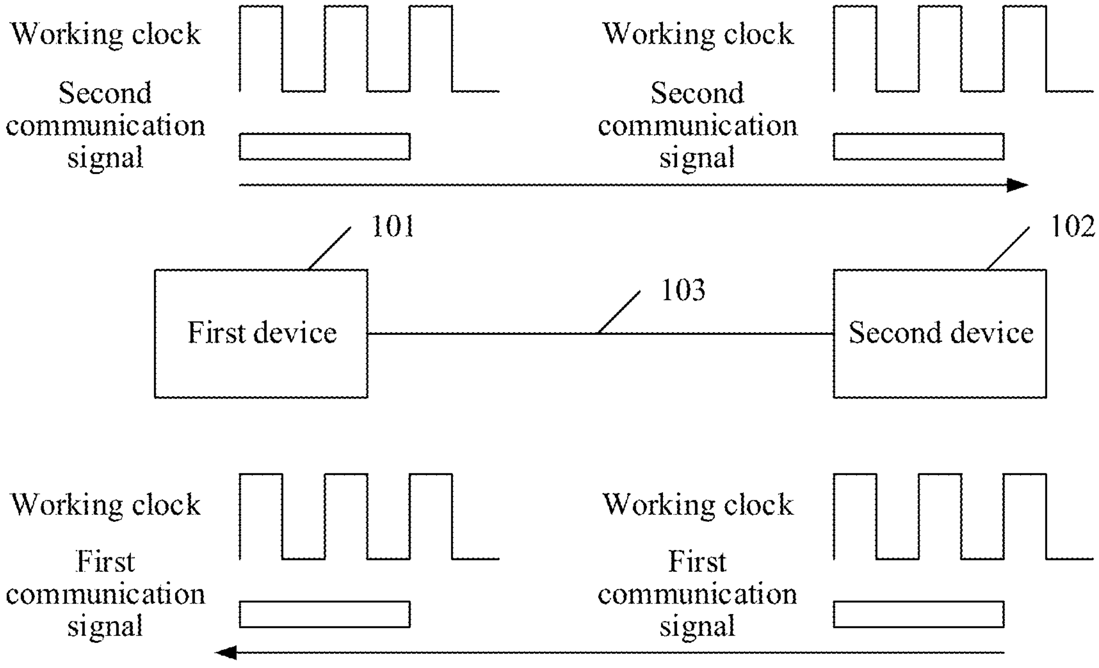
FIG. 2 is a schematic diagram of a working clock according to an embodiment of this application.

For example, refer to FIG. 2. The working clock of the first clock counter is a signal. Each time a rising edge or a falling edge of the signal arrives, the first device 101 sends the second communication signal to the second device 102. In addition, the first device 101 inputs the signal to the first clock counter, and the first clock counter is configured to count the rising edge or the falling edge of the signal.

In some embodiments, the signal is a periodic waveform signal, for example, a square wave signal or a sine wave signal.

The second clock counter is for counting. When sending the first communication signal to the first device 101, the second device 102 obtains a working clock of the second clock counter, and sends the first communication signal to the first device 101 based on the working clock of the second clock counter.

For example, refer to FIG. 2. The working clock of the second clock counter is also a signal. Each time a rising edge or a falling edge of the signal arrives, the second device 102 sends the first communication signal to the first device 101. In addition, the second device 102 inputs the signal to the second clock counter, and the second clock counter is configured to count the rising edge or the falling edge of the signal.

In some embodiments, the first clock and the second clock are high-precision clocks. The first clock in the first device is configured to provide time, and the second clock in the second device is configured to provide time.

In some embodiments, the network architecture 100 includes an optical transmission system, a packet transmission system, or the like.

Figure 3:
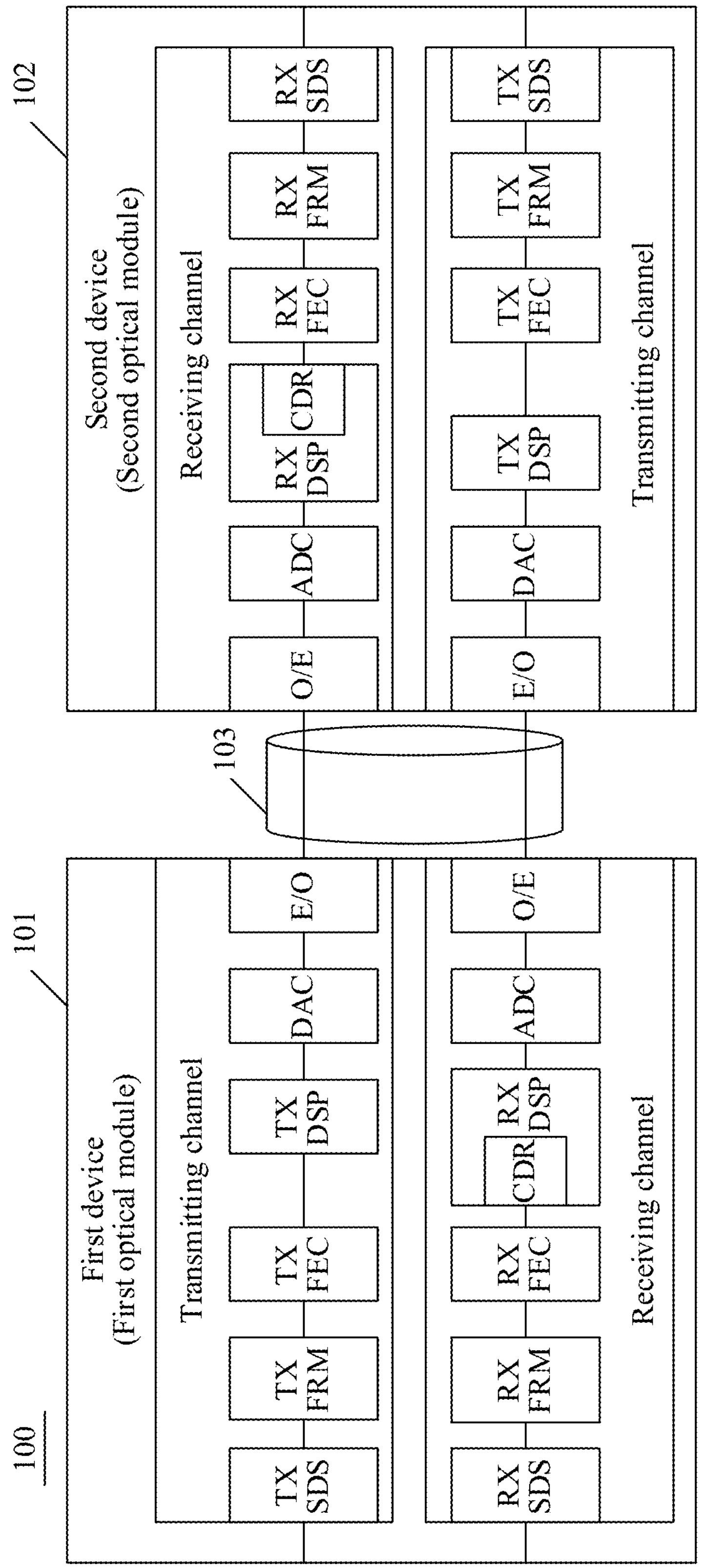
FIG. 3 is a schematic diagram of another network architecture according to an embodiment of this application.

When the network architecture 100 is an optical transmission system, refer to FIG. 3. The first device 101 includes a first optical module, and the second device 102 includes a second optical module. The first device 101 sends the second communication signal to the second device 102 by using the first optical module, and the second device 102 sends the first communication signal to the first device 101 by using the second optical module.

A structure of the first optical module is the same as that of the second optical module, and the first optical module (or the second optical module) includes a transmitting channel and a receiving channel. The transmitting channel includes a transmission serializer/deserializer (TX SDS), a transmission framer/deframer (TX FRM), a transmission forward error control (TX FEC), a transmission digital signal processor (TX DSP), a digital to analog converter (DAC), and an electrical-to-optical conversion module (E/O) interface. The receiving channel includes a reception serializer/deserializer (RX SDS), a reception framer/deframer (RX FRM), a reception forward error control (RX FEC), a reception digital signal processor (RX DSP), an analog to digital converter (ADC), and an optical-to-electrical conversion module (O/E) interface. The RX DSP includes clock data recovery (CDR).

In some embodiments, the first link is a link between a receiving channel of the first device and a transmitting channel of the second device, and the second link is a link between a transmitting channel of the first device and a receiving channel of the second device.

In some embodiments, a process in which the first device 101 sends the second communication signal to the second device 102 is as follows.

For the first optical module included in the first device 101, a TX SDS in the first optical module receives first data from a board of the first device 101, where the first data is data that the first device 101 needs to send to the second device 102, and the first data is serial data. The TX SDS converts the first data into parallel data, where a format of the parallel data is a first format. The TX SDS inputs the data in the first format to a TX FRM. The first format includes a first optical transport unit (OTU) service format or an ethernet service format.

The TX FRM converts the data in the first format into data in a second OTU service format, and inputs the data in the second OTU service format to a TX FEC. The first OUT service format is different from the second OUT service format.

The TX FEC performs FEC encoding on the data in the second OTU service format to obtain a first bit stream, and inputs the first bit stream to a TX DSP.

The TX DSP performs preprocessing on the first bit stream to obtain a first code stream. The first code stream includes at least one code stream frame. The preprocessing includes channel equalization processing, noise reduction processing, and the like. The TX DSP inputs the first code stream to a DAC.

The DAC converts the first code stream into a first analog signal based on the working clock of the first clock counter, and inputs the first analog signal to an E/O interface.

The E/O interface converts the first analog signal into a first optical signal, where the first optical signal is the second communication signal. The E/O interface sends the second communication signal to the second device 102 on the first line 103.

For the second optical module included in the second device 102, an O/E interface in the second optical module receives the second communication signal from the first line 103, converts the second communication signal into the first analog signal, and inputs the first analog signal to an ADC.

The ADC converts the first analog signal into the first code stream, and inputs the first code stream to an RX DSP.

The RX DSP converts the first code stream into a binary first bit stream, and inputs the binary first bit stream to an RX FEC.

The RX FEC performs FEC decoding on the binary first bit stream to obtain data in the second OTU service format, and inputs the data in the second OTU service format to an RX FRM.

The RX FRM converts the data in the second OTU service format into data in the first format, where the data in the first format is parallel data. The RX FRM inputs the data in the first format to an RX SDS.

The RX SDS converts the data in the first format into serial first data, and inputs the first data to a board of the second device 102.

In some embodiments, a process in which the second device 102 sends the first communication signal to the first device 101 is as follows.

For the second optical module included in the second device 102, the TX SDS in the second optical module receives second data from the board of the second device 102, where the second data is data that the second device 102 needs to send to the first device 101, and the data is serial data. The TX SDS converts the data into parallel data, where a format of the parallel data is the first format. The TX SDS inputs the data in the first format to the TX FRM.

The TX FRM converts the data in the first format into data in the second OTU service format, and inputs the data in the second OTU service format to the TX FEC.

The TX FEC performs the FEC encoding on the data in the second OTU service format to obtain a second bit stream, and inputs the second bit stream to the TX DSP.

The TX DSP performs preprocessing on the second bit stream to obtain a second code stream. The second code stream includes at least one code stream frame. The TX DSP inputs the second code stream to the DAC.

The DAC converts the second code stream into a second analog signal based on the working clock corresponding to the second clock counter, and inputs the second analog signal to the E/O interface.

The E/O interface converts the second analog signal into a second optical signal, where the second optical signal is the first communication signal. The E/O interface sends the first communication signal to the first device 101 on the first line 103.

For the first optical module included in the first device 101, the O/E interface in the first optical module receives the first communication signal from the first line 103, converts the first communication signal into the second analog signal, and inputs the second analog signal to the ADC.

The ADC converts the second analog signal into the second code stream, and inputs the second code stream to the RX DSP.

The RX DSP converts the second code stream into a binary second bit stream, and inputs the binary second bit stream to the RX FEC.

The RX FEC performs the FEC decoding on the binary second bit stream to obtain data in the second OTU service format, and inputs the data in the second OTU service format to the RX FRM.

The RX FRM converts the data in the second OTU service format into data in the first format, where the data in the first format is parallel data. The RX FRM inputs the data in the first format to the RX SDS.

The RX SDS converts the data in the first format into serial second data, and inputs the second data to the board of the first device 101.

It should be noted that the first line 103 may be affected by an external factor, causing an exception occurring on the first line 103. For example, the first line 103 may be affected by factors such as electromagnetic interference, external extrusion, external bending, and/or lightning shock, causing an exception occurring on the first line 103.

For an exception occurring on the first line 103, when the first line 103 is affected by an external factor, an exception occurs on the first line 103, and when the external factor affecting the first line 103 ceases to have an effect, the first line 103 may return to normal. In other words, the exception occurring on the first line 103 is a temporary exception. For example, when the first line 103 is affected by the electromagnetic interference, an exception occurs on the first line 103, and after the electromagnetic interference affecting the first line 103 disappears, the first line 103 returns to normal. Alternatively, when the first line 103 is affected by an external factor, an exception occurs on the first line 103, and when the external factor effecting the first line 103 ceases to have an effect, the exception occurring on the first line 103 does not disappear. In other words, the exception occurring on the first line 103 is a permanent exception, and the first line 103 is faulty. For example, when the first line 103 suffers external extrusion, external bending, and/or lightning shock, an internal structure of the first line 106 is damaged, and the first line 103 is faulty.

When an exception occurs on the first line 103, for the first communication signal transmitted on the first line 103, the first communication signal changes abruptly to a first exception signal when passing through a location of the exception, and the first exception signal continues to be transmitted to the first device 101. The first device 101 receives the first exception signal, and parses the first exception signal. Consequently, a bit error may be generated.

A performance parameter of the first communication signal does not exceed a specified threshold. When the first communication signal passes through the location of the exception, the performance parameter of the first communication signal changes abruptly, the first communication signal changes to the first exception signal, and a performance parameter of the first exception signal exceeds a specified threshold.

The performance parameter of the first communication signal includes at least one of the following: signal power, a signal-to-noise ratio (SNR), a polarization-dependent loss (PDL), a bit error rate (BER), a packet loss rate, a state of polarization (SOP) value, and the like.

That the performance parameter of the first communication signal does not exceed the specified threshold means that the signal power of the first communication signal is greater than or equal to a specified power threshold, the signal-to-noise ratio of the first communication signal is greater than or equal to a specified signal-to-noise ratio threshold, the polarization-dependent loss of the first communication signal is less than or equal to a specified loss threshold, the bit error rate of the first communication signal is less than or equal to a specified bit error rate threshold, the packet loss rate of the first communication signal is less than or equal to a specified packet loss rate threshold, and/or the state of polarization value of the first communication signal is less than or equal to a specified state of polarization threshold.

That the performance parameter of the first exception signal exceeds the specified threshold means that signal power of the first exception signal is less than a specified power threshold, a signal-to-noise ratio of the first exception signal is less than a specified signal-to-noise ratio threshold, a polarization-dependent loss of the first exception signal is greater than a specified loss threshold, a bit error rate of the first exception signal is greater than a specified bit error rate threshold, a packet loss rate of the first communication signal is greater than a specified packet loss rate threshold, and/or a state of polarization value of the first communication signal is greater than a specified state of polarization threshold.

For the second communication signal transmitted on the first line 103, the second communication signal changes abruptly to a second exception signal when passing through the location of the exception, and the second exception signal continues to be transmitted to the second device 102. The second device 102 receives the second exception signal, and parses the second exception signal. Consequently, a bit error may be generated.

A performance parameter of the second communication signal does not exceed a specified threshold. When the second communication signal passes through the location of the exception, the performance parameter of the second communication signal changes abruptly, the second communication signal changes to the second exception signal, and a performance parameter of the second exception signal exceeds a specified threshold.

That the performance parameter of the second communication signal does not exceed the specified threshold means that signal power of the second communication signal is greater than or equal to a specified power threshold, a signal-to-noise ratio of the second communication signal is greater than or equal to a specified signal-to-noise ratio threshold, a polarization-dependent loss of the second communication signal is less than or equal to a specified loss threshold, a bit error rate of the second communication signal is less than or equal to a specified bit error rate threshold, a packet loss rate of the second communication signal is less than or equal to a specified packet loss rate threshold, and/or a state of polarization value of the second communication signal is less than or equal to a specified state of polarization threshold.

That the performance parameter of the second exception signal exceeds the specified threshold means that signal power of the second exception signal is less than a specified power threshold, a signal-to-noise ratio of the second exception signal is less than a specified signal-to-noise ratio threshold, a polarization-dependent loss of the second exception signal is greater than a specified loss threshold, a bit error rate of the second exception signal is greater than a specified bit error rate threshold, a packet loss rate of the second communication signal is greater than a specified packet loss rate threshold, and/or a state of polarization value of the second communication signal is greater than a specified state of polarization threshold.

When an exception occurs on the first line 103, a communication signal transmitted on the first line 103 changes to an exception signal. Consequently, a device receiving the exception signal generates a bit error. Therefore, an exception that occurs on the first line 106 is located, to obtain a location of the exception, so that a technician can view and/or repair, based on the location, the exception that occurs on the first line 103.

Figure 4:
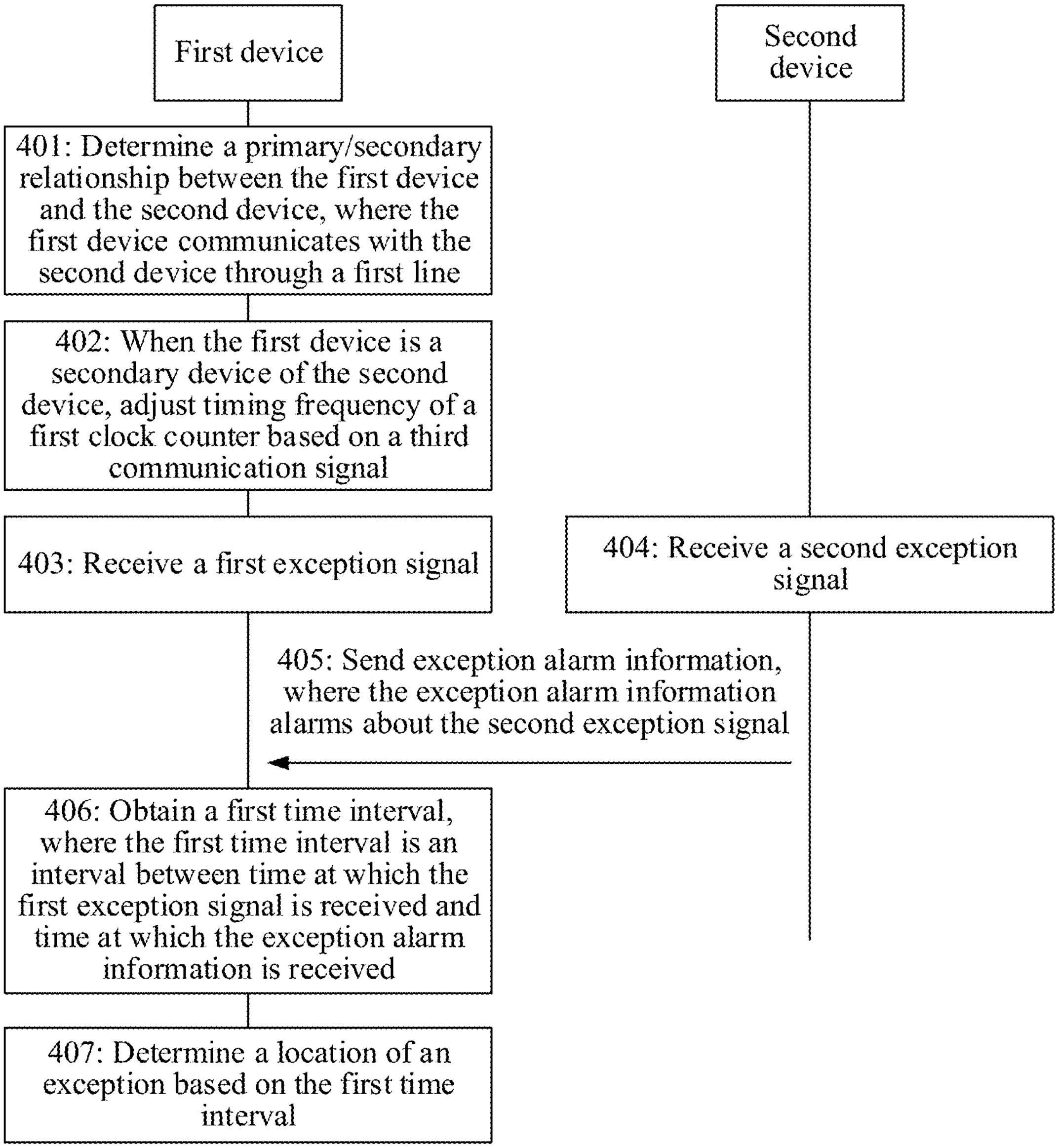
FIG. 4 is a flowchart of an exception locating method according to an embodiment of this application.

Refer to FIG. 4. An embodiment of this application provides an exception locating method 400. The method 400 may be applied to the network architecture 100 shown in FIG. 1, FIG. 2, or FIG. 3, and includes the following operations.

Operation 401: A first device determines a primary/secondary relationship between the first device and a second device, where the first device communicates with the second device through a first line.

In operation 401, the first device determines the primary/secondary relationship between the first device and the second device by performing the following operations 4011 to 4013. The operations 4011 to 4013 are respectively as follows.

4011: The first device sends device information of the first device to the second device.

In some embodiments, the device information of the first device includes a device identifier of the first device and/or resource information of the first device.

In some embodiments, the device identifier of the first device is a character string, including at least one character, and the at least one character includes a letter, a digit, and/or the like.

In some embodiments, the resource information of the first device includes at least one resource parameter. The at least one resource parameter includes at least one of processor frequency, a quantity of processor cores, a storage resource size, and the like of the first device.

In some embodiments, when being enabled, the first device sends the device information of the first device to the second device, and/or the first device regularly or irregularly sends the device information of the first device to the second device.

In the same way as the first device, the second device may also send device information of the second device to the first device.

4012: The first device receives the device information of the second device.

4013: The first device determines the primary/secondary relationship between the first device and the second device based on the device information of the first device and the device information of the second device.

The primary/secondary relationship is that the first device is a primary device of the second device, in other words, the second device is a secondary device of the first device. Alternatively, the primary/secondary relationship is that the first device is a secondary device of the second device, in other words, the second device is a primary device of the first device.

When the device information of the first device includes the device identifier of the first device, and the device information of the second device includes a device identifier of the second device, the first device compares the device identifier of the first device with the device identifier of the second device, and determines the primary/secondary relationship between the first device and the second device based on a comparison result.

In some embodiments, when the device identifier of the first device consists of digits and the device identifier of the second device consists of digits, when the device identifier of the first device consists of letters and the device identifier of the second device consists of letters, or when the device identifier of the first device consists of digits and/or letters, and the device identifier of the second device consists of digits and/or letters, the first device compares the device identifier of the first device with the device identifier of the second device, to obtain a sorting order between the device identifier of the first device and the device identifier of the second device. A device corresponding to a device identifier that is sorted first is used as a primary device, and a device corresponding to a device identifier that is sorted later is used as a secondary device. Alternatively, a device corresponding to a device identifier that is sorted first is used as a secondary device, and a device corresponding to a device identifier that is sorted second is used as a primary device.

For example, assuming that the device identifier of the first device is "123" and the device identifier of the second device is "124", the device identifier "123" of the first device is compared with the device identifier "124" of the second device, to learn that the device identifier "123" of the first device is sorted before the device identifier "124" of the second device. Therefore, the first device corresponding to the device identifier "123" is used as a primary device, and the device corresponding to the device identifier "124" is used as a secondary device.

For another example, assuming that the device identifier of the first device is "abc", and the device identifier of the second device is "acd", the device identifier "abc" of the first device is compared with the device identifier "acd" of the second device. Because first letters of the two device identifiers are both "a", and a second letter "b" in the device identifier of the first device is sorted before a second letter "c" in the device identifier of the second device, to learn that the device identifier "abc" of the first device is sorted before the device identifier "acd" of the second device. Therefore, the first device corresponding to the device identifier "abc" is used as a primary device, and the device corresponding to the device identifier "acd" is used as a secondary device.

For still another example, assuming that the device identifier of the first device is "a12", and the device identifier of the second device is "a23", the device identifier "a12" of the first device is compared with the device identifier "a23" of the second device. Because first characters of the two device identifiers are both "a", and a second character "1" in the device identifier of the first device is sorted before a second character "2" in the device identifier of the second device, to learn that the device identifier "a12" of the first device is sorted before the device identifier "a23" of the second device. Therefore, the first device corresponding to the device identifier "a12" is used as a primary device, and the device corresponding to the device identifier "a23" is used as a secondary device.

When the device information of the first device includes the resource information of the first device, and the device information of the second device includes resource information of the second device, the first device compares the resource information of the first device with the resource information of the second device, and determines the primary/secondary relationship between the first device and the second device based on a comparison result.

In some embodiments, the first device compares the resource information of the first device with the resource information of the second device, to obtain a device with an optimal resource, uses the device as a primary device, and uses the other device as a secondary device.

When the resource information of the first device includes one resource parameter, and the resource information of the second device includes one resource parameter, the first device compares the resource parameter included in the resource information of the first device with the resource parameter included in the resource information of the second device, to obtain a device with an optimal resource.

For example, assuming that the resource information of the first device includes the processor frequency of the first device, and the resource information of the second device includes processor frequency of the second device, the processor frequency of the first device is compared with the processor frequency of the second device. If the processor frequency of the first device is higher than the processor frequency of the second device, in other words, a resource of the first device is better than a resource of the second device, the first device is used as a primary device, and the second device is used as a secondary device. If the processor frequency of the first device is lower than the processor frequency of the second device, in other words, the resource of the second device is better than the resource of the first device, the second device is used as a primary device, and the first device is used as a secondary device.

For another example, assuming that the resource information of the first device includes the quantity of processor cores of the first device, and the resource information of the second device includes a quantity of processor cores of the second device, the quantity of processor cores of the first device is compared with the quantity of processor cores of the second device. If the quantity of processor cores of the first device is more than the quantity of processor cores of the second device, in other words, the resource of the first device is better than the resource of the second device, the first device is used as a primary device, and the second device is used as a secondary device. If the quantity of processor cores of the first device is less than the quantity of processor cores of the second device, in other words, the resource of the second device is better than the resource of the first device, the second device is used as a primary device, and the first device is used as a secondary device.

For still another example, assuming that the resource information of the first device includes the storage resource size of the first device, and the resource information of the second device includes a storage resource size of the second device, the storage resource size of the first device is compared with the storage resource size of the second device. If the storage resource size of the first device is greater than the storage resource size of the second device, in other words, the resource of the first device is better than the resource of the second device, the first device is used as a primary device, and the second device is used as a secondary device. If the storage resource size of the first device is less than the storage resource size of the second device, in other words, the resource of the second device is better than the resource of the first device, the second device is used as a primary device, and the first device is used as a secondary device.

When the resource information of the first device includes a plurality of resource parameters, and the resource information of the second device includes a plurality of resource parameters, the first device obtains a device parameter of the first device based on the resource information of the first device, where the device parameter indicates the resource of the first device. A device parameter of the second device is obtained based on the resource information of the second device, where the device parameter indicates the resource of the second device. The device parameter of the first device is compared with the device parameter of the second device, to obtain a device with an optimal resource, and the device is used as a primary device, and the other device is used as a secondary device.

In some embodiments, the first device performs weighted processing on the plurality of resource parameters included in the resource information of the first device, to obtain the device parameter of the first device, and performs weighted processing on the plurality of resource parameters included in the resource information of the second device, to obtain the device parameter of the second device.

For example, assuming that the resource information of the first device includes the processor frequency and the storage resource size of the first device, and the resource information of the second device includes the processor frequency and the storage resource size of the second device, the device parameter corresponding to the first device is calculated based on the resource information of the first device by using the following first formula, and the device parameter of the second device is calculated based on the resource information of the second device by using the following first formula.

The first formula is:

$$Z=F*\lambda_1+R*\lambda_2.$$

Z is a device parameter of the first device, F is processor frequency of the first device, and R is a storage resource size of the first device. Alternatively, Z is a device parameter of the second device, F is processor frequency of the second device, and R is a storage resource size of the second device. * is a multiplication operation, and $\lambda_1$ and $\lambda_2$ are respectively weights corresponding to processor frequency and a storage resource size.

The device parameter of the first device is compared with the device parameter of the second device. If the device parameter of the first device is higher than the device parameter of the second device, in other words, the resource of the first device is better than the resource of the second device, the first device is used as a primary device, and the second device is used as a secondary device. If the device parameter of the first device is lower than the device parameter of the second device, in other words, the resource of the second device is better than the resource of the first device, the second device is used as a primary device, and the first device is used as a secondary device.

In some embodiments, the first device also sends the device information of the first device to the second device, so that the second device determines the primary/secondary relationship between the first device and the second device in the same way as the first device.

In some embodiments, when determining the primary/secondary relationship between the first device and the second device, the first device sends the primary/secondary relationship to the second device. In this case, the first device may not send the device information of the first device to the second device, in other words, the second device may not need to determine the primary/secondary relationship between the first device and the second device.

Operation 402: When the first device is a secondary device of the second device, the first device adjusts timing frequency of a first clock counter based on a third communication signal, to enable the timing frequency of the first clock counter to be synchronized with timing frequency of a second clock counter, where the third communication signal is a communication signal sent by the second device.

The first device includes the first clock counter, and the second device includes the second clock counter. When the first line between the first device and the second device is normal, the second device may send a normal communication signal to the first device. The sending process is as follows. Because the second device is a primary device, the second device generates a working clock of the second clock counter, and sends the third communication signal to the first device based on the working clock of the second clock counter.

Because the first device is a secondary device of the second device, after receiving the third communication signal, the first device recovers the working clock of the second clock counter based on the third communication signal. The first device adjusts the timing frequency of the first clock counter based on the working clock. The adjusted timing frequency of the first clock counter is equal to the timing frequency of the second clock counter, or the timing frequency of the second clock counter is N times the adjusted timing frequency of the first clock counter, where N is an integer greater than 1.

In some embodiments, the first device can determine the timing frequency of the second clock counter based on the working clock.

In some embodiments, for the working clock that is of the second clock counter and that is generated by the second device, the working clock is a signal, and the second clock counter counts a rising edge or a falling edge of the working clock. The first device recovers the working clock of the second clock counter, uses the working clock as a working clock of the first clock counter, and inputs the working clock to the first clock counter. The first clock counter counts a rising edge or a falling edge of the working clock, to adjust the timing frequency of the first clock counter, and enable the timing frequency of the first clock counter to be equal to the timing frequency of the second clock counter.

In some embodiments, the first device generates a working clock of the first clock counter based on the recovered working clock of the second clock counter, and inputs the working clock to the first clock counter. The first clock counter counts a rising edge or a falling edge of the working clock, to adjust the timing frequency of the first clock counter, and enable the timing frequency of the first clock counter to be equal to the timing frequency of the second clock counter, or enable the timing frequency of the second clock counter to be N times the adjusted timing frequency of the first clock counter.

When the first line between the first device and the second device is normal, the first device may send a normal communication signal to the second device. The sending process is as follows. The first device sends a fourth communication signal to the second device based on the working clock of the first clock counter.

In some embodiments, the first device and the second device establish a first link and a second link on the first line, the second device sends the third communication signal to the first device through the first link, and the first device sends the fourth communication signal to the second device through the second link.

In some embodiments, refer to FIG. 3. In a case of application to an optical transmission system, the first device receives the third communication signal through an O/E interface, and the O/E interface of the first device converts the third communication signal into a third analog signal, and inputs the third analog signal to an ADC of the first device. The ADC of the first device converts the third analog signal into a third code stream, and inputs the third code stream to an RX DSP of the first device. The RX DSP of the first device converts the third code stream into a binary third bit stream. The RX DSP includes CDR, and the CDR recovers the working clock of the second clock counter based on the third code stream. The first device adjusts the timing frequency of the first clock counter based on the working clock of the second clock counter.

The RX DSP of the first device further inputs the binary third bit stream to an RX FEC of the first device. The RX FEC of the first device performs FEC decoding on the binary third bit stream to obtain data in a second OTU service format, and inputs the data in the second OTU service format to an RX FRM of the first device. The RX FRM of the first device converts the data in the second OTU service format into data in a first format, where the data in the first format is parallel data. The RX FRM inputs the data in the first format to an RX SDS of the first device. The RX SDS of the first device converts the data in the first format into serial data, and inputs the serial data to a board of the first device.

When the second device is a secondary device of the first device, the second device recovers the working clock of the first clock counter based on the fourth communication signal, and adjusts the timing frequency of the second clock counter based on the working clock of the first clock counter. The adjusted timing frequency of the second clock counter is equal to the timing frequency of the first clock counter, or the timing frequency of the first clock counter is N times the adjusted timing frequency of the second clock counter, where N is an integer greater than 1.

In some embodiments, in the case of application to the optical transmission system, the second device receives the fourth communication signal through an O/E interface, and the O/E interface of the second device converts the fourth communication signal into a fourth analog signal, and inputs the fourth analog signal to an ADC of the second device. The ADC of the second device converts the fourth analog signal into a fourth code stream, and inputs the fourth code stream to an RX DSP of the second device. The RX DSP of the second device converts the fourth code stream into a binary fourth bit stream. The RX DSP includes CDR. The CDR recovers the working clock of the first clock counter based on the fourth code stream. The second device adjusts the timing frequency of the second clock counter based on the working clock of the first clock counter.

The RX DSP of the second device further inputs the binary fourth bit stream to an RX FEC of the second device. The RX FEC of the second device performs the FEC decoding on the binary fourth bit stream to obtain data in the second OTU service format, and inputs the data in the second OTU service format to an RX FRM of the second device. The RX FRM of the second device converts the data in the second OTU service format into data in the first format, where the data in the first format is parallel data. The RX FRM inputs the data in the first format to an RX SDS of the second device. The RX SDS of the second device converts the data in the first format into serial data, and inputs the serial data to a board of the second device.

A detailed implementation of the second device adjusting the timing frequency of the second clock counter is the same as that of the first device adjusting the timing frequency of the first clock counter, and details are not described herein again.

The foregoing operation 401 and operation 402 are optional operations, that is, the first device may not perform the foregoing operation 401 and operation 402. In other words, the first device and/or the second device may not need to determine the primary/secondary relationship between the first device and the second device, and the first device and/or the second device may not need to enable the timing frequency of the first clock counter to be synchronized with the timing frequency of the second clock counter. In this case, when an exception occurs on the first line between the first device and the second device, the first device locates a location of the exception by using the following operations.

For example, when the first device includes a high-precision first clock, and the second device includes a high-precision second clock, the foregoing operation 404 and operation 402 may not be performed.

After the timing frequency of the first clock counter of the first device is enabled to be synchronized with the timing frequency of the second clock counter of the second device, when an exception occurs on the first line between the first device and the second device, the first device locates the location of the exception by using the following operations.

Operation 403: The first device receives a first exception signal, where the first exception signal is a signal that changes abruptly from a first communication signal when the first communication signal passes through a location of an exception on the first line, and the first communication signal is a signal sent by the second device to the first device through the first line.

When the second device sends the first communication signal to the first device on the first line, the first communication signal is a normal communication signal sent by the second device to the first device. When an exception occurs on the first line, and when the first communication signal is transmitted to a location of the exception on the first line, the first communication signal changes abruptly, and the first communication signal changes from a normal communication signal to an abnormal first exception signal. The first exception signal continues to be transmitted to the first device on the first line, and a transmission rate of the first exception signal is the same as a transmission rate of the first communication signal.

In some embodiments, a performance parameter of the first communication signal does not exceed a specified threshold. When the first communication signal passes through the location of the exception, the performance parameter of the first communication signal changes abruptly, the first communication signal changes to the first exception signal, and a performance parameter of the first exception signal exceeds a specified threshold.

In operation 403, the first device receives a signal from the first line (the first link on the first line), detects a performance parameter of the signal, and determines, when detecting that the performance parameter of the signal exceeds a specified threshold, that the received signal is a first exception signal.

In some embodiments, the first exception signal is an exception signal received by the first device for the first time.

The performance parameter of the signal includes at least one of the following: signal power, a signal-to-noise ratio, a polarization-dependent loss, a bit error rate, a packet loss rate, a state of polarization value, and the like.

In some embodiments, when the first device detects that the signal power of the signal is less than a specified power threshold, the signal-to-noise ratio of the signal is less than a specified signal-to-noise ratio threshold, the polarization-dependent loss of the signal is greater than a specified loss threshold, the bit error rate of the signal is greater than a specified bit error rate threshold, the packet loss rate of the signal is greater than a specified packet loss rate threshold, and/or the state of polarization value of the signal is greater than a specified state of polarization threshold, the first device determines that the signal is a first exception signal.

In the case of application to the optical transmission system, for a process in which the second device sends the first communication signal, refer to the process in which the second device sends the first communication signal to the first device in the embodiment shown in FIG. 1. A process in which the first device determines the first exception signal may be as follows. Refer to FIG. 3. The O/E interface of the first device receives a signal from the first line (the first link on the first line), and inputs the signal to the ADC of the first device. The ADC of the first device converts the signal into a first code stream, and inputs the first code stream to the RX DSP of the first device. The RX DSP of the first device detects a performance parameter of the first code stream, and determines, when detecting that the performance parameter of the first code stream exceeds a specified threshold, that the received signal is the first exception signal, in other words, the first exception signal is detected.

In some embodiments, the first device further obtains a first count value, where the first count value is a count value of the first clock counter when the first device receives the first exception signal, and/or the first device obtains first receiving time, where the first receiving time is time of the first clock when the first device receives the first exception signal.

In some embodiments, when the RX DSP of the first device detects the first exception signal, the first device obtains a count value of the first clock counter, to obtain a first count value, and/or when the RX DSP of the first device detects the first exception signal, the first device obtains time of the first clock, to obtain first receiving time.

Operation 404: The second device receives a second exception signal, where the second exception signal is a signal that changes abruptly from a second communication signal when the second communication signal passes through the location of the exception on the first line, and the second communication signal is a signal sent by the first device to the second device through the first line.

In the same way as the second device, when the first device sends the second communication signal to the second device on the first line, the second communication signal is also a normal communication signal sent by the first device to the second device. When an exception occurs on the first line, and when the second communication signal is transmitted to the location of the exception on the first line, the second communication signal changes abruptly, and the second communication signal changes from a normal communication signal to an abnormal second exception signal. The second exception signal continues to be transmitted to the second device on the first line, and a transmission rate of the second exception signal is the same as a transmission rate of the second communication signal.

In some embodiments, a performance parameter of the second communication signal does not exceed a specified threshold. When the second communication signal passes through the location of the exception, the performance parameter of the second communication signal changes abruptly, the second communication signal changes to the second exception signal, and a performance parameter of the second exception signal exceeds a specified threshold.

In operation 404, the second device receives a signal from the first line (the second link on the first line), detects a performance parameter of the signal, and determines, when detecting that the performance parameter of the signal exceeds a specified threshold, that the received signal is a second exception signal.

In some embodiments, the second exception signal is an exception signal received by the second device for the first time.

The performance parameter of the signal includes at least one of the following: signal power, a signal-to-noise ratio, a polarization-dependent loss, a bit error rate, a packet loss rate, a state of polarization value, and the like.

In some embodiments, when the second device detects that the signal power of the signal is less than a specified power threshold, the signal-to-noise ratio of the signal is less than a specified signal-to-noise ratio threshold, the polarization-dependent loss of the signal is greater than a specified loss threshold, the bit error rate of the signal is greater than a specified bit error rate threshold, the packet loss rate of the signal is greater than a specified packet loss rate threshold, and/or the state of polarization value of the signal is greater than a specified state of polarization threshold, the second device determines that the signal is a second exception signal.

In the case of application to the optical transmission system, for a process in which the first device sends the second communication signal, refer to the process in which the first device sends the first communication signal to the second device in the embodiment shown in FIG. 1. A process in which the second device determines the second exception signal may be as follows. Refer to FIG. 3. The O/E interface of the second device receives a signal from the first line (the second link on the first line), and inputs the signal to the ADC of the second device. The ADC of the second device converts the signal into a second code stream, and inputs the second code stream to the RX DSP of the second device. The RX DSP of the second device detects a performance parameter of the second code stream, and determines, when detecting that the performance parameter of the second code stream exceeds a specified threshold, that the received signal is the second exception signal, that is, the second exception signal is detected.

In some embodiments, the second device further obtains a third count value, where the third count value is a count value of the second clock counter when the second device receives the second exception signal, and/or the second device obtains second receiving time, where the second receiving time is time of the second clock when the second device receives the second exception signal.

In some embodiments, when the RX DSP of the second device detects the second exception signal, the second device obtains a count value of the second clock counter, to obtain a third count value, and/or when the RX DSP of the second device detects the second exception signal, the second device obtains time of the second clock, to obtain second receiving time.

Operation 405: The second device sends exception alarm information to the first device, where the exception alarm information alarms about the second exception signal.

In some embodiments, the exception alarm information is a specified information sequence or the like.

In operation 405, in a case of application to a packet transmission system, the second device sends a first packet to the first device, where a reserved field of the first packet includes the exception alarm information. Alternatively, in the case of application to the optical transmission system, the second device sends a fifth code stream to the first device, where an idle field of the fifth code stream includes the exception alarm information.

Because the reserved field of the first packet includes the exception alarm information, or the idle field of the fifth code stream includes the exception alarm information, no service overhead is occupied, to prevent service transmission from being affected.

In some embodiments, the second device further obtains a fourth count value, where the fourth count value is a count value of the second clock counter when the second device sends the exception alarm information, and/or the second device obtains first sending time, where the first sending time is time of the second clock when the second device sends the exception alarm information.

In some embodiments, for the foregoing operation of sending the exception alarm information through the fifth code stream, the second device implements the operation in the following two manners:

Manner 1: The second device obtains at least one to-be-sent first code stream frame, and adds the exception alarm information to an idle field of the at least one first code stream frame to obtain at least one second code stream frame, where the fifth code stream includes the at least one second code stream frame, and the second device sends the fifth code stream to the first device.

Figure 5:
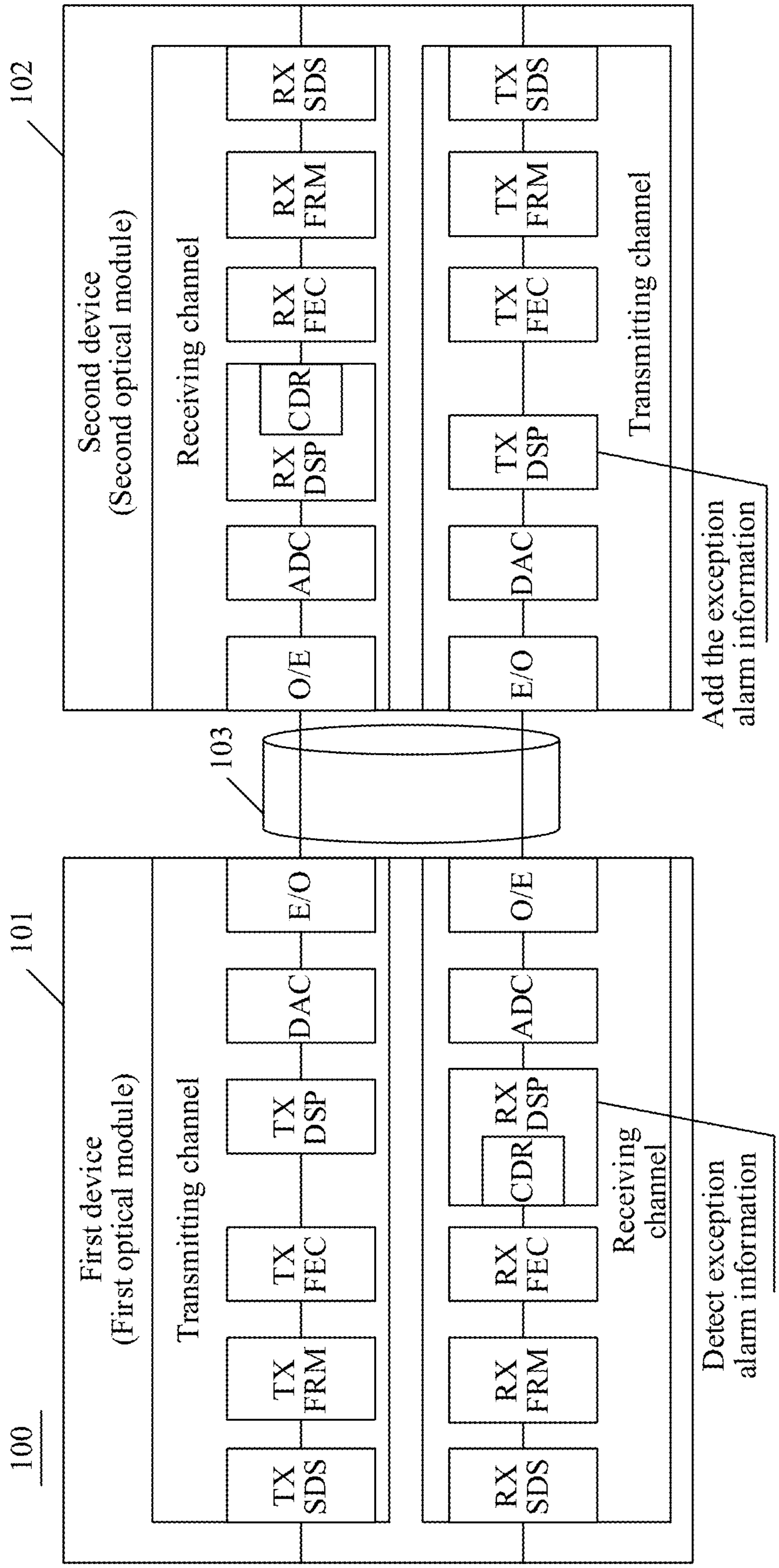
FIG. 5 is a schematic diagram of adding exception alarm information and detecting the exception alarm information according to an embodiment of this application.

During implementation, refer to FIG. 5. The TX SDS of the second device receives third data sent by the board of the second device, where the third data is data that the second device needs to send to the first device, and the third data is serial data. The TX SDS converts the third data into parallel third data, and inputs the parallel third data to the TX FRM of the second device. The TX FRM of the second device converts the parallel third data into third data in the second OTU service format, and inputs the third data in the second OTU service format into the TX FEC of the second device. The TX FEC of the second device performs FEC encoding on the third data in the second OTU service format to obtain a fifth bit stream, and sends the fifth bit stream to the TX DSP of the second device. The TX DSP of the second device preprocesses the fifth bit stream to obtain at least one first code stream frame, adds the exception alarm information to the at least one first code stream frame to obtain at least one second code stream frame, and inputs the fifth code stream to the DAC of the second device. The fifth code stream includes the at least one second code stream frame. The DAC of the second device converts the fifth code stream into a fifth analog signal based on the working clock of the first clock counter, and inputs the fifth analog signal to the E/O interface of the second device. The E/O interface of the second device converts the fifth analog signal into a fifth optical signal, where the fifth optical signal is a communication signal. The E/O interface sends the fifth optical signal to the first device on the first line, to send the fifth code stream to the first device.

In some embodiments, when the second device adds the exception alarm information to the at least one first code stream frame, the second device obtains a count value of the second clock counter, to obtain a fourth count value, and/or when the second device adds the exception alarm information to the at least one first code stream frame, the second device obtains time of the second clock, to obtain first sending time.

Manner 2: The second device obtains at least one to-be-sent first service frame, where the at least one first service frame is data in the second OUT service format, the second device adds the exception alarm information to an idle field of the at least one first service frame to obtain at least one second service frame, converts the at least one second service frame into a fifth code stream, and sends the fifth code stream to the first device.

Figure 6:
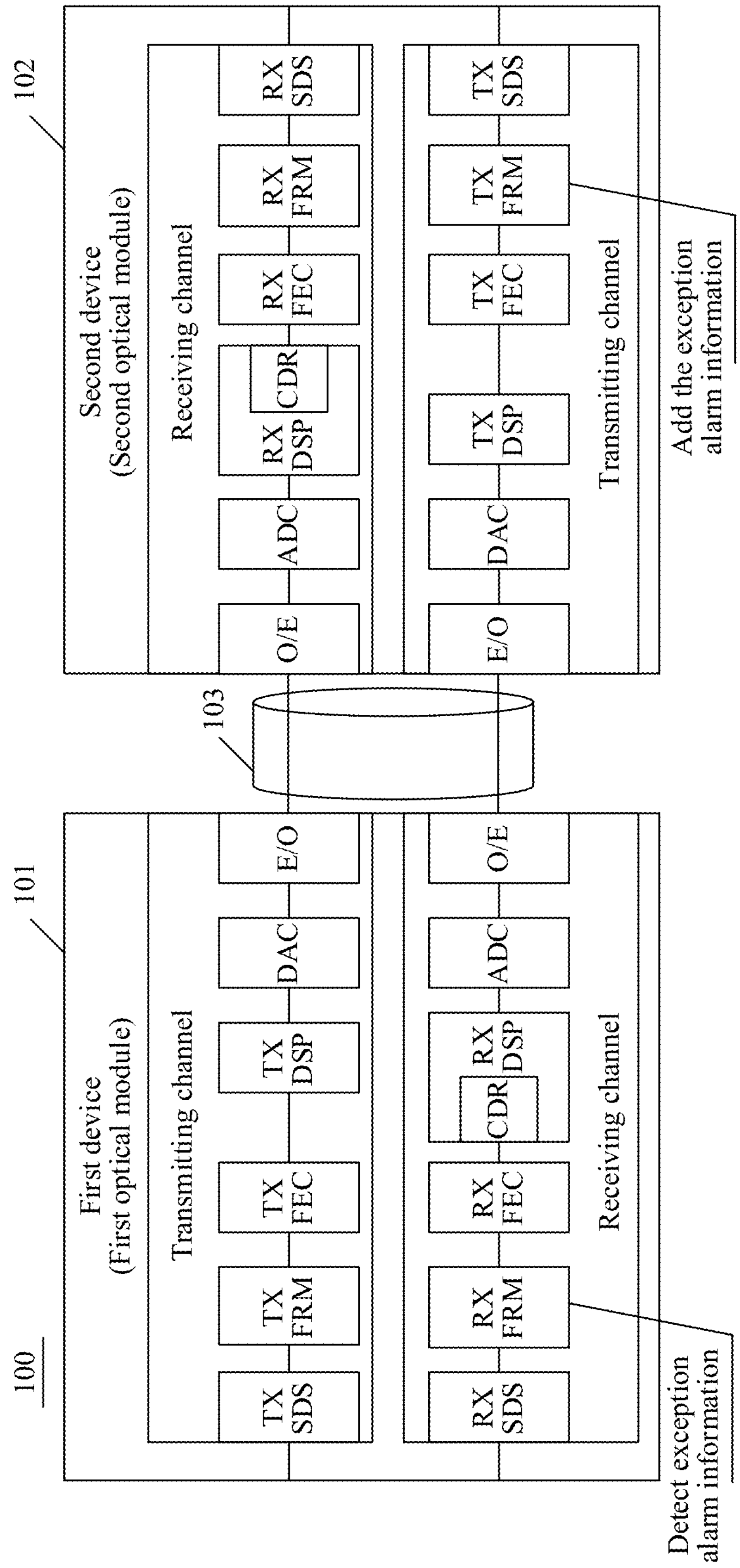
FIG. 6 is another schematic diagram of adding exception alarm information and detecting the exception alarm information according to an embodiment of this application.

During implementation, refer to FIG. 6. The TX SDS of the second device receives fifth data sent by the board of the second device, where the fifth data is data that the second device needs to send to the first device, and the fifth data is serial data. The TX SDS converts the fifth data into parallel fifth data, and inputs the parallel fifth data to the TX FRM of the second device. The TX FRM of the second device converts the parallel fifth data into fifth data in the second OTU service format, where the fifth data in the second OUT format includes at least one first service frame. The TX FRM adds the exception alarm information to an idle field of the at least one first service frame to obtain at least one second service frame, and inputs the at least one second service frame to the TX FEC of the second device. The TX FEC of the second device performs the FEC encoding on the at least one second service frame to obtain a fifth bit stream, and sends the fifth bit stream to the TX DSP of the second device. The TX DSP of the second device preprocesses the fifth bit stream to obtain a fifth code stream, and inputs the fifth code stream to the DAC of the second device. The DAC of the second device converts the fifth code stream into a fifth analog signal based on the working clock of the first clock counter, and inputs the fifth analog signal to the E/O interface of the second device. The E/O interface of the second device converts the fifth analog signal into a fifth optical signal, where the fifth optical signal is a communication signal. The E/O interface sends the fifth optical signal to the first device on the first line, to send the fifth code stream to the first device.

In some embodiments, when the second device adds the exception alarm information to the idle field of the at least one first service frame, the second device obtains a count value of the second clock counter, to obtain a fourth count value, and/or when the second device adds the exception alarm information to the idle field of the at least one first service frame, the second device obtains time of the second clock, to obtain first sending time.

In some embodiments, the second device sends first delay information to the first device, where the first delay information includes a third count value and a fourth count value, the first delay information includes a difference between a third count value and a fourth count value, the first delay information includes second receiving time and first sending time, or the first delay information includes a second time interval. The second time interval is an interval between time at which the second device receives the second exception signal and time at which the second device sends the exception alarm information.

In some embodiments, the second device obtains the second time interval based on the third count value and the fourth count value by using the following second formula.

The second formula is $$\Delta t2=|(T3-T4)/f2|.$$

In the second formula, Δt2 is a second time interval, T3 is a third count value, T4 is a fourth count value, and f2 is timing frequency of the second clock counter.

In some embodiments, the second device obtains the second time interval based on the second receiving time and the first sending time.

In some embodiments, the second time interval is a specified time interval. In other words, the interval between the time at which the second device receives the second exception signal and the time at which the second device sends the exception alarm information is a specified time interval. In this case, alternatively, the second device may not need to obtain the third count value, the fourth count value, the second receiving time, and the first sending time, and/or send the first delay information to the first device.

When the second time interval is the specified time interval, and when the second device detects the second exception signal, the second device starts to wait. When waiting time reaches the specified time interval, the second device adds the exception alarm information to the at least one to-be-sent first code stream frame, or adds the exception alarm information to the to-be-sent first service frame, that is, the second device starts to perform a procedure of sending the exception alarm information.

It should be noted that regardless of whether an exception on the first line is a temporary exception or a permanent exception, a signal transmission rate on the first line is not affected by the exception. In other words, a signal transmission rate on the first line before an exception occurs on the first line is equal to a signal transmission rate on the first line after the exception occurs on the first line.

Operation 406: The first device receives the exception alarm information, and obtains a first time interval, where the first time interval is an interval between time at which the first exception signal is received and time at which the exception alarm information is received.

In some embodiments, the first device obtains a second count value, where the second count value is a count value of the first clock counter when the first device receives the exception alarm information. The first time interval is obtained by using the following third formula based on the first count value and the second count value.

The third formula is $$\Delta t1=|(T1-T2)/f2|.$$

In the third formula, Δt1 is a first time interval, T1 is a first count value, T2 is a second count value, and f1 is timing frequency of the first clock counter.

Additionally/Alternatively, in some embodiments, the first device obtains third receiving time, where the third receiving time is time of the first clock when the first device receives the exception alarm information. The first device obtains the first time interval based on the first receiving time and the third receiving time.

In operation 406, the first device receives the first packet, and detects the exception alarm information from the reserved field of the first packet, or the first device receives the fifth code stream, and detects the exception alarm information from the idle field of the fifth code stream.

In some embodiments, when the first device detects the exception alarm information, the first device obtains a count value of the first clock counter, to obtain a second count value, and/or the first device obtains time of the first clock, to obtain third receiving time.

In some embodiments, for the operation of detecting, by the first device, the exception alarm information from the idle field of the fifth code stream, the first device implements the operation in the following two manners:

Manner 1: The first device receives the fifth optical signal from the first line, and parses out at least one second code stream frame from the fifth optical signal. When detecting a specified information sequence from the at least one second code stream frame, the first device detects that the exception alarm information is received, where the exception alarm information is the specified information sequence.

During implementation, refer to FIG. 5. The O/E interface of the first device receives the fifth optical signal from the first line (the first link on the first line), converts the fifth optical signal into a fifth analog signal, and inputs the fifth analog signal to the ADC of the first device. The ADC of the first device converts the fifth analog signal into a fifth code stream, where the fifth code stream includes the at least one second code stream frame. The ADC inputs the fifth code stream to the RX DSP of the first device. When detecting the specified information sequence from the fifth code stream, the RX DSP of the first device detects that the exception alarm information is received.

Refer to FIG. 5. The RX DSP of the first device further obtains a binary fifth bit stream based on the fifth code stream, and inputs the binary fifth bit stream to the RX FEC of the first device. The RX FEC performs the FEC decoding on the binary fifth bit stream to obtain third data in the second OTU service format, and inputs the third data in the second OTU service format to the RX FRM of the first device. The RX FRM converts the third data in the second OTU service format into third data in the first format, where the third data is parallel data. The RX FRM inputs the parallel third data to the RX SDS of the first device. The RX SDS converts the parallel third data into serial third data, and inputs the serial third data to the board of the first device.

In some embodiments, when the RX DSP of the first device detects the exception alarm information, the first device obtains the count value of the first clock counter, to obtain the second count value, and/or when the RX DSP of the first device detects the exception alarm information, the first device obtains the time of the first clock, to obtain the third receiving time.

Manner 2: The first device receives the fifth optical signal from the first line, and parses out at least one second service frame from the fifth optical signal. When detecting the exception alarm information from the at least one second service frame, the first device detects that the exception alarm information is received.

During implementation, refer to FIG. 6. The O/E interface of the first device receives the fifth optical signal from the first line (the first link on the first line), converts the fifth optical signal into a fifth analog signal, and inputs the fifth analog signal to the ADC of the first device. The ADC of the first device converts the fifth signal into a fifth code stream, and inputs the fifth code stream to the RX DSP of the first device. The RX DSP of the first device converts the fifth code stream into a binary fifth bit stream, and inputs the binary fifth bit stream to the RX FEC of the first device. The RX FEC performs the FEC decoding on the binary fifth bit stream to obtain data in the second OTU service format, where the data in the second OUT service format includes at least one second service frame, and the RX FEC inputs the at least one second service frame to the RX FRM of the first device. The RX FRM detects the exception alarm information from the at least one second service frame.

The RX FRM further obtains third data in the first format based on the at least one second service frame, where the third data is parallel data, and the RX FRM inputs the parallel third data to the RX SDS of the first device. The RX SDS converts the parallel third data into serial third data, and inputs the serial third data to the board of the first device.

In some embodiments, when the RX FRM of the first device detects the exception alarm information from the at least one second service frame, the first device obtains the count value of the first clock counter, to obtain the second count value, and/or when the RX FRM of the first device detects the exception alarm information from the at least one second service frame, the first device obtains the time of the first clock, to obtain the third receiving time.

Operation 407: The first device determines a location of the exception based on the first time interval.

In some embodiments, the location of the exception is a distance between the exception and the first device on the first line.

In some embodiments, the first device determines the location of the exception according to the following fourth formula.

$$X=L-C*[\Delta t1]/2.$$ The fourth formula is:

In the fourth formula, X is the distance between the exception and the first device, L is a length of the first line and is a fixed known value, and C is a signal transmission rate on the first line and is a fixed known value.

Refer to FIG. 1. At time m0, a first communication signal sent by the second device to the first device changes abruptly to a first exception signal, and a second communication signal sent by the first device to the second device changes abruptly to a second exception signal. The first device receives the first exception signal at time m1, where m1|m0=X/C, that is, m1=X/C+m0. The second device receives the second exception signal at time m2, where m2−m0=(L−X)/C, that is, m2=(L−X)/C+m0. However, duration of transmitting the exception alarm information on the first line is L/C. Assuming that the second time interval between the time at which the second device receives the second exception signal and the time at which the second device sends the exception alarm information is not counted, the time at which the first device receives the exception alarm information is m3=m2+L/C=(L−X)/C+m0+L/C. In this case, the first time interval is Δt1=m3−m1=(L−X)/C+m0+L/C−(X/C+m0)=2L/C−2X/C. Therefore, the foregoing first formula X=L−C*[Δt1]/2 is obtained.

In some embodiments, the first device further obtains the second time interval, and determines the location of the exception based on the first time interval and the second time interval.

In some embodiments, the first device determines the location of the exception based on the first time interval and the second time interval according to the following fifth formula.

$$X=L-C*[\Delta t1-\Delta t2]/2.$$ The fifth formula is:

In some embodiments, the operation of obtaining, by the first device, the second time interval is: The first device receives the first delay information sent by the second device, and obtains the second time interval based on the first delay information.

When the first delay information includes the second time interval, the first device obtains the second time interval from the first delay information.

When the first delay information includes the third count value and the fourth count value, the first device obtains the second time interval according to the second formula based on the timing frequency of the second clock counter, the third count value, and the fourth count value. Alternatively, when the first delay information includes the difference between the third count value and the fourth count value, the first device obtains the second time interval according to the second formula based on the timing frequency of the second clock counter and the difference. Alternatively, when the first delay information includes the second receiving time and the sending time, the first device obtains the second time interval based on the second receiving time and the first sending time.

Because the timing frequency of the first clock counter of the first device is synchronized with the timing frequency of the second clock counter of the second device, precision of obtaining the second time interval can be improved, and precision of determining the location of the exception can be greatly improved.

In some embodiments, when the second time interval is a specified time interval, the first device directly uses the specified time interval as the second time interval.

In some embodiments, the first device determines the location of the exception based on a device internal delay, the first time interval, and the second time interval.

Figure 7:
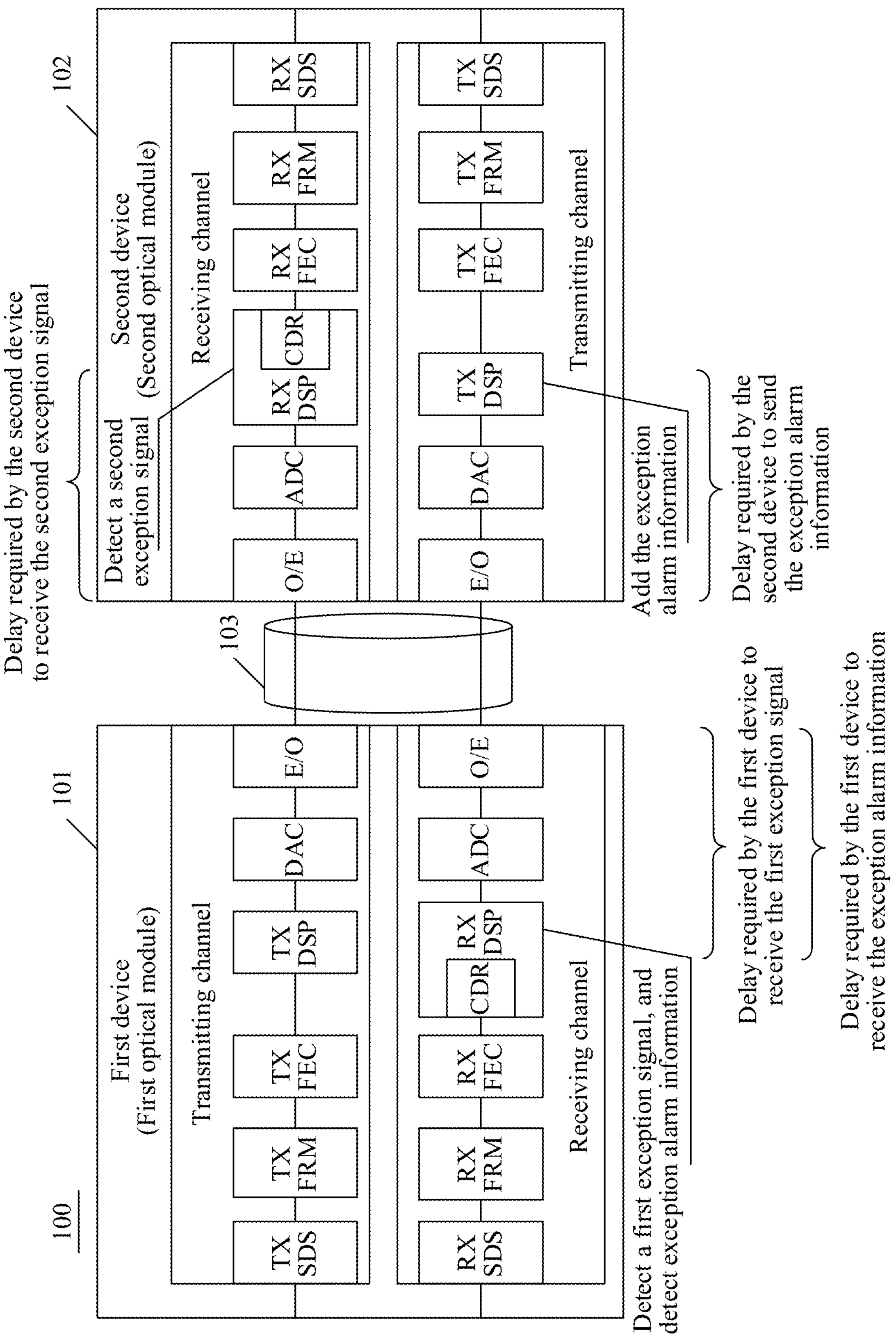
FIG. 7 is a schematic diagram of detecting a first exception signal and a second exception signal, adding exception alarm information, and detecting the exception alarm information according to an embodiment of this application.
Figure 8:
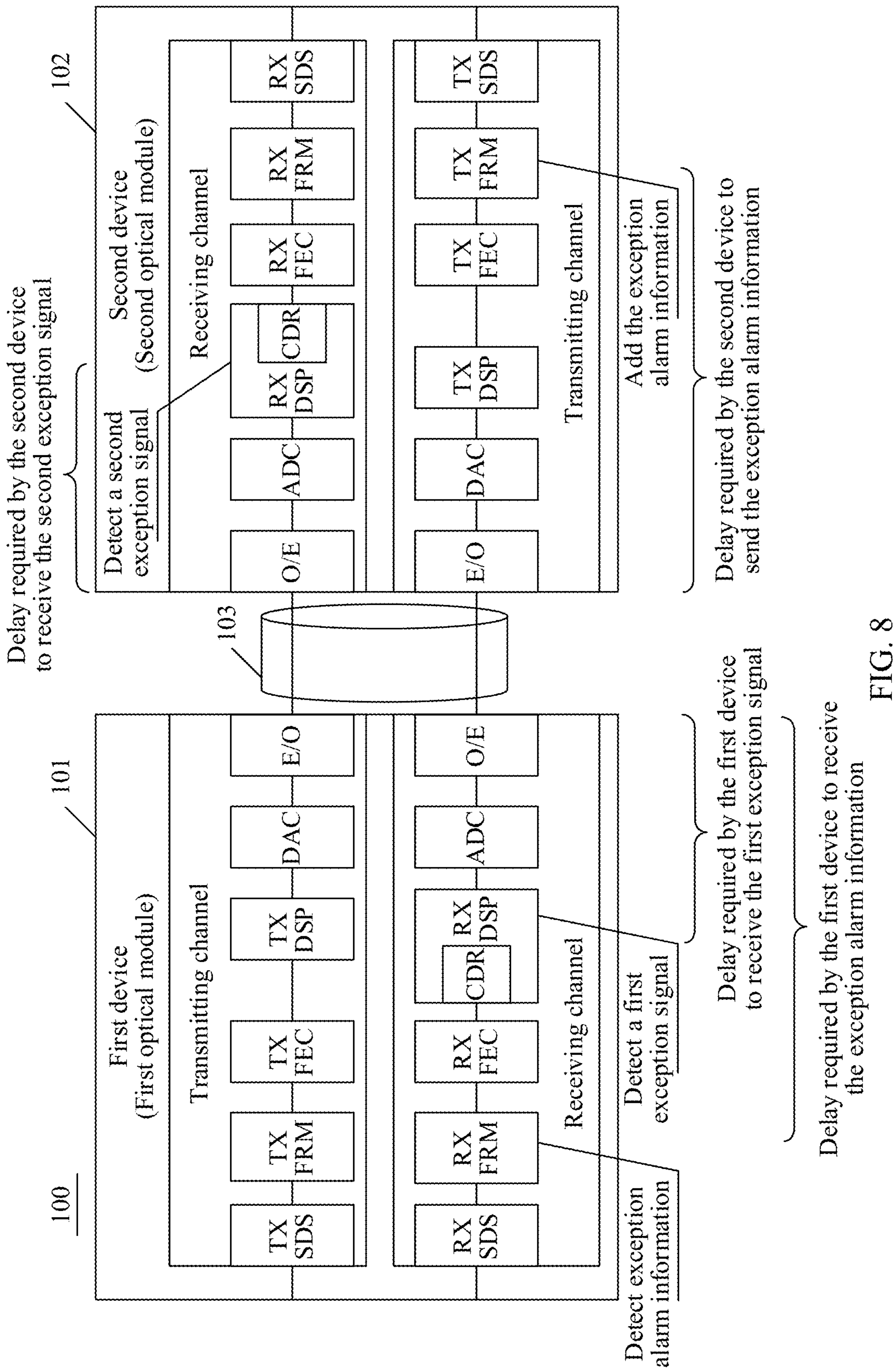
FIG. 8 is another schematic diagram of detecting a first exception signal and a second exception signal, adding exception alarm information, and detecting the exception alarm information according to an embodiment of this application.

In some embodiments, refer to FIG. 7 or FIG. 8. The device internal delay includes a delay required by the first device to receive the first exception signal, a delay required by the second device to receive the second exception signal, a delay required by the second device to send the exception alarm information, and a delay required by the first device to receive the exception alarm information. In other words, the device internal delay includes four delays, and the device internal delay is equal to an accumulated value of the four delays.

In some embodiments, the first device determines the location of the exception based on the device internal delay, the first time interval, and the second time interval according to the following sixth formula.

$$X=L-C*[\Delta t1-\Delta t2-t0]/2. \quad \text{The sixth formula is:}$$

In the sixth formula, to is a device internal delay.

Because the device internal delay is introduced when the location of the exception is determined, precision of determining the location of the exception can be greatly improved.

For the device internal delay, the following two manners of obtaining the device internal delay are listed. Certainly, in addition to the two manners, there may alternatively be other implementations, which are not listed one by one herein. The two manners are as follows.

Figure 9:
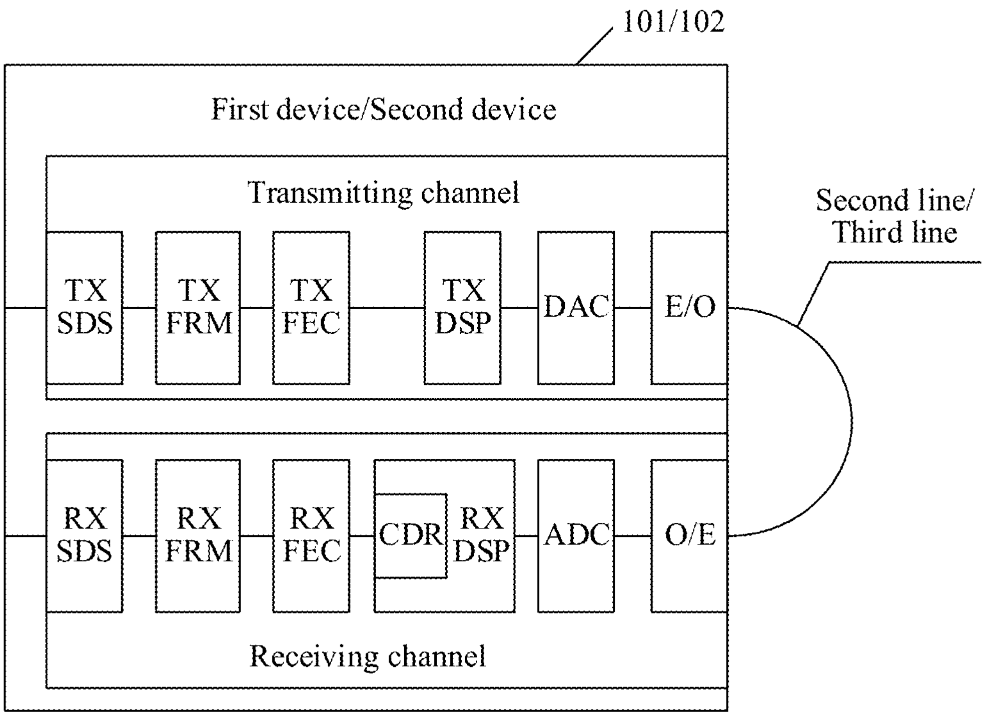
FIG. 9 is a schematic diagram of measuring a device internal delay according to an embodiment of this application.

In a first manner, refer to FIG. 9. A second line is used to connect an E/O interface and an O/E interface of the first device, and a third line is used to connect an E/O interface and an O/E interface of the second device. The first device measures the device internal delay through the second line and the second device measures the device internal delay through the third line.

In the first manner, the first device sends first measurement information to the first device through the second line, receives the first measurement information, and obtains a third time interval, where the third time interval is an interval between time at which the first measurement information is sent and time at which the first measurement information is received. The second device sends second measurement information to the second device through the third line, receives the second measurement information, and obtains a fourth time interval. The fourth time interval is an interval between time at which the second measurement information is sent and time at which the second measurement information is received. An accumulated value of the third time interval and the fourth time interval is equal to the device internal delay.

In the first manner, the first device obtains a fifth count value and/or second sending time. The fifth count value is a count value of a first clock counter when the first device sends the first measurement information, and the second sending time is time at which the first device sends the first measurement information. The first device obtains a sixth count value and/or fourth receiving time. The sixth count value is a count value of the first clock counter when the first device receives the first measurement information, and the fourth receiving time is time at which the first device receives the first measurement information. The first device obtains the third time interval based on the fifth count value, the sixth count value, and the timing frequency of the first clock counter, and/or obtains the third time interval based on the second sending time and the fourth receiving time.

In the first manner, the second device obtains a seventh count value and/or third sending time. The seventh count value is a count value of the second clock counter when the second device sends the second measurement information, and the third sending time is time at which the second device sends the second measurement information. The second device obtains an eighth count value and/or fifth receiving time. The eighth count value is a count value of the second clock counter when the second device receives the second measurement information, and the fifth receiving time is time at which the second device receives the second measurement information. The second device obtains the fourth time interval based on the seventh count value, the eighth count value, and the timing frequency of the second clock counter, and/or obtains the fourth time interval based on the third sending time and the fifth receiving time.

In the case of application to the optical transmission system, the first manner has the following two cases. A first case is a case in which the second device sends the exception alarm information to the first device in the foregoing Manner 1. A second case is a case in which the second device sends the exception alarm information to the first device in the foregoing manner 2.

In the first case, a process in which the first device sends and receives the first measurement information is as follows. The TX DSP of the first device preprocesses the first measurement information to obtain a sixth code stream, and inputs the sixth code stream to the DAC of the first device. The DAC converts the sixth code stream into a sixth analog signal, and inputs the sixth analog signal to the E/O interface of the first device. The E/O interface converts the sixth analog signal into a sixth optical signal, and sends the sixth optical signal on the second line.

The O/E interface of the first device receives the sixth optical signal from the second line, converts the sixth optical signal into the sixth analog signal, and inputs the sixth analog signal to the ADC of the first device. The ADC converts the sixth analog signal into the sixth code stream, and inputs the sixth code stream to the RX DSP of the first device. The RX DSP obtains the first measurement information based on the sixth code stream.

In some embodiments, when the TX DSP of the first device preprocesses the first measurement information, the first device obtains a count value of the first clock counter to obtain a fifth count value, and/or obtains time of the first clock to obtain second sending time. When the RX DSP of the first device obtains the first measurement information based on the sixth code stream, the first device obtains a count value of the first clock counter to obtain a sixth count value, and/or obtains time of the first clock to obtain fourth receiving time.

A process in which the second device sends and receives the second measurement information is as follows. The TX DSP of the second device preprocesses the second measurement information to obtain a seventh code stream, and inputs the seventh code stream to the DAC of the second device. The DAC converts the seventh code stream into a seventh analog signal, and inputs the seventh analog signal to the E/O interface of the second device. The E/O interface converts the seventh analog signal into a seventh optical signal, and sends the seventh optical signal on the third line.

The O/E interface of the second device receives the seventh optical signal from the third line, converts the seventh optical signal into the seventh analog signal, and inputs the seventh analog signal to the ADC of the second device. The ADC converts the seventh analog signal into the seventh code stream, and inputs the seventh code stream to the RX DSP of the second device. The RX DSP obtains the second measurement information based on the seventh code stream.

In some embodiments, when the TX DSP of the second device preprocesses the second measurement information, the second device obtains a count value of the second clock counter to obtain a seventh count value, and/or obtains time of the second clock to obtain third sending time. When the RX DSP of the second device obtains the second measurement information based on the seventh code stream, the second device obtains a count value of the second clock counter to obtain an eighth count value, and/or obtains time of the second clock to obtain fifth receiving time.

A process in which the first device sends and receives the first measurement information in the second case is the same as the process in which the first device sends and receives the first measurement information in the first case, and details are not described herein again.

In the second case, a process in which the second device sends and receives the second measurement information is as follows. The TX FRM of the second device converts the first measurement information into data in the second OTU service format, and inputs the data in the second OTU service format to the TX FEC of the second device. The TX FEC performs the FEC encoding on the data in the second OTU service format to obtain a seventh bit stream, and inputs the seventh bit stream to the TX DSP of the second device. The TX DSP preprocesses the seventh bit stream to obtain a seventh code stream, and inputs the seventh code stream to the DAC of the second device. The DAC converts the seventh code stream into a seventh analog signal based on the working clock corresponding to the second clock counter, and inputs the seventh analog signal to the E/O interface of the second device. The E/O interface converts the seventh analog signal into a seventh optical signal, and sends the seventh optical signal on the third line.

The O/E interface of the second device receives the seventh optical signal from the third line, converts the seventh optical signal into the seventh analog signal, and inputs the seventh analog signal to the ADC of the second device. The ADC converts the seventh analog signal into a seventh code stream, and inputs the seventh code stream to the RX DSP of the second device. The RX DSP converts the seventh code stream into a binary seventh bit stream, and inputs the binary seventh bit stream to the RX FEC of the second device. The RX FEC performs the FEC decoding on the binary seventh bit stream to obtain data in the second OTU service format, and inputs the data in the second OTU service format to the RX FRM of the second device. The RX FRM obtains the second measurement information based on the data in the second OTU service format.

In some embodiments, when the TX FRM of the second device converts the first measurement information into the data in the second OTU service format, the second device obtains a count value of the second clock counter to obtain the seventh count value, and/or obtains time of the second clock to obtain the third sending time. When the RX FRM of the second device obtains the second measurement information based on the data in the second OTU service format, the second device obtains a count value of the second clock counter to obtain the eighth count value, and/or obtains time of the second clock to obtain the fifth receiving time.

In a second manner, the first device sends a measurement request to the second device. The second device receives the measurement request, and sends a measurement response to the first device. The first device receives the measurement response, and obtains the device internal delay based on the measurement request and the measurement response.

In the second manner, the first device obtains a third time interval and a fourth time interval. The third time interval is an interval between time at which the second device receives the measurement request and time at which the second device sends the measurement response, and the fourth time interval is an interval between time at which the first device sends the measurement request and time at which the first device receives the measurement response. The device internal delay is obtained based on the third time interval, the fourth time interval, and a length of the first line according to the following seventh formula.

The seventh formula is:

$$t0=\Delta t4-\Delta t3-2*L/C.$$

In the seventh formula, t0 is the device internal delay, Δt4 is a fourth time interval, Δt3 is a third time interval, L is a length of the first line, and C is a rate of a signal transmitted on the first line.

In some embodiments, the first device receives second delay information sent by the second device, where the second delay information indicates the third time interval, and the first device obtains the third time interval based on the second delay information.

In some embodiments, the first device sends a measurement request to the second device, to obtain a fifth count value and/or second sending time. The fifth count value is a count value of the first clock counter when the first device sends the measurement request, and the second sending time is time at which the first device sends the measurement request. The second device receives the measurement request, and obtains a sixth count value and/or fourth receiving time. The sixth count value is a count value of the second clock counter when the second device receives the measurement request, and the fourth receiving time is time at which the second device receives the measurement request. The second device sends a measurement response to the first device, to obtain a seventh count value and/or third sending time. The seventh count value is a count value of the second clock counter when the second device sends the measurement response, and the third sending time is time at which the second device sends the measurement response. The second device sends the second delay information to the first device. The second delay information is obtained based on the sixth count value and the seventh count value, or is obtained based on the fourth receiving time and the third sending time. The first device receives the measurement response and the second delay information, and obtains an eighth count value and/or fifth receiving time. The eighth count value is a count value of the first clock counter when the first device receives the measurement response, and the fifth receiving time is time at which the first device receives the measurement response. The first device obtains the fourth time interval based on the fifth count value, the eighth count value, and the timing frequency of the first clock counter, and/or obtains the fourth time interval based on the second sending time and the fifth receiving time. The first device obtains the third time interval based on the second delay information, and obtains the device internal delay based on the third time interval, the fourth time interval, and the length of the first line.

In the case of application to the optical transmission system, the second manner has the following two cases. A first case is a case in which the second device sends the exception alarm information to the first device in the foregoing Manner 1, and a second case is a case in which the second device sends the exception alarm information to the first device in the foregoing manner 2.

In the first case, a process in which the first device sends the measurement request, and the second device receives the measurement request is as follows. The TX DSP of the first device preprocesses the measurement request to obtain a sixth code stream, and inputs the sixth code stream to the DAC of the first device. The DAC converts the sixth code stream into a sixth analog signal, and inputs the sixth analog signal to the E/O interface of the first device. The E/O interface converts the sixth analog signal into a sixth optical signal, and sends the sixth optical signal on the first line. The O/E interface of the second device receives the sixth optical signal from the first line, converts the sixth optical signal into the sixth analog signal, and inputs the sixth analog signal to the ADC of the first device. The ADC converts the sixth analog signal into the sixth code stream, and inputs the sixth code stream to the RX DSP of the second device. The RX DSP obtains the measurement request based on the sixth code stream.

A process in which the second device sends the measurement response, and the first device receives the measurement response is as follows. The TX DSP of the second device preprocesses the measurement response to obtain a seventh code stream, and inputs the seventh code stream to a DAC of the second device. The DAC converts the seventh code stream into a seventh analog signal, and inputs the seventh analog signal to the E/O interface of the second device. The E/O interface converts the seventh analog signal into a seventh optical signal, and sends the seventh optical signal on the first line. The O/E interface of the first device receives the seventh optical signal from the first line, converts the seventh optical signal into the seventh analog signal, and inputs the seventh analog signal to the ADC of the second device. The ADC converts the seventh analog signal into the seventh code stream, and inputs the seventh code stream to the RX DSP of the first device. The RX DSP obtains the measurement response based on the seventh code stream.

In some embodiments, when the TX DSP of the first device preprocesses the measurement request, the first device obtains a count value of the first clock counter to obtain a fifth count value, and/or obtains time of the first clock to obtain second sending time. When the RX DSP of the second device obtains the measurement request based on the sixth code stream, the second device obtains a count value of the second clock counter to obtain a sixth count value, and/or obtains time of the second clock to obtain fourth receiving time. When the TX DSP of the second device preprocesses the measurement response, the second device obtains a count value of the second clock counter to obtain a seventh count value, and/or obtains time of the second clock to obtain third sending time. When the RX DSP of the first device obtains the measurement response based on the seventh code stream, the second device obtains a count value of the second clock counter to obtain an eighth count value, and/or obtains time of the second clock to obtain fifth receiving time.

A process in which the first device sends the measurement request and the second device receives the measurement request in the second case is the same as a process in which the first device sends the measurement request and the second device receives the measurement request in the first case, and details are not described herein again.

In the second case, a process in which the second device sends the measurement response and the first device receives the measurement response is as follows. The TX FRM of the second device converts the measurement request into data in the second OTU service format, and inputs the data in the second OTU service format to the TX FEC of the second device. The TX FEC performs the FEC encoding on the data in the second OTU service format to obtain a seventh bit stream, and inputs the seventh bit stream to the TX DSP of the second device. The TX DSP preprocesses the seventh bit stream to obtain a seventh code stream, and inputs the seventh code stream to the DAC of the second device. The DAC converts the seventh code stream into a seventh analog signal, and inputs the seventh analog signal to the E/O interface of the second device. The E/O interface converts the seventh analog signal into a seventh optical signal, and sends the seventh optical signal on the first line.

The O/E interface of the first device receives the seventh optical signal from the first line, converts the seventh optical signal into the seventh analog signal, and inputs the seventh analog signal to the ADC of the first device. The ADC converts the seventh analog signal into the seventh code stream, and inputs the seventh code stream to the RX DSP of the first device. The RX DSP converts the seventh code stream into a binary seventh bit stream, and inputs the binary seventh bit stream to the RX FEC of the first device. The RX FEC performs the FEC decoding on the binary seventh bit stream to obtain data in the second OTU service format, and inputs the data in the second OTU service format to the RX FRM of the first device. The RX FRM obtains the measurement request based on the data in the second OTU service format.

In some embodiments, when the TX FRM of the second device converts the measurement response into the data in the second OTU service format, the second device obtains a count value of the second clock counter to obtain a seventh count value, and/or obtains time of the second clock to obtain third sending time. When the RX FRM of the first device obtains the measurement response based on the data in the second OTU service format, the first device obtains a count value of the first clock counter to obtain an eighth count value, and/or obtains time of the first clock to obtain fifth receiving time.

The process in which the second device sends the measurement response and the first device receives the measurement response in the second case is the same as a process in which the second device sends the measurement response and the first device receives the measurement response in the first case, and details are not described herein again. For the process in which the first device sends the measurement request and the second device receives the measurement request, refer to the process in which the second device sends the measurement response and the first device receives the measurement response in the second case. Details are not described herein again.

In this embodiment of this application, the first device receives the first exception signal, and the second device receives the second exception signal, and sends the exception alarm information to the first device. The first device obtains the first time interval based on the first exception signal and the exception alarm information, and determines the location of the exception on the first line based on the first time interval, to automatically determine the location of the exception, improve efficiency of determining the location of the exception, and avoid missing detection of the exception that occurs on the first line. When the exception is located, emergency repair may be performed in time to avoid a greater accident. When sending the exception alarm information, the second device directly sends the exception alarm information through the first link on the first line. The first link is used to transmit a communication signal sent by the second device to the first device. In this case, a channel used to transmit the exception alarm information does not need to be separately established on the first link, and an exception occurs on a communication resource. The exception can be automatically located, and a line fault map can be drawn. Therefore, an area in which the exception is located can be avoided when a line is laid.

Figure 10:
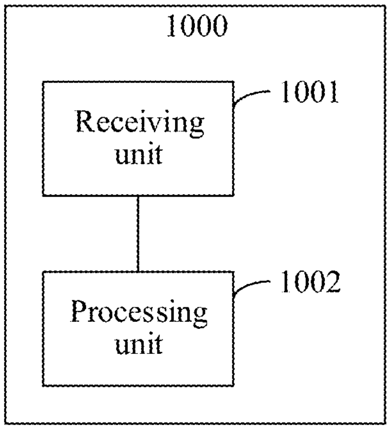
FIG. 10 is a schematic diagram of a structure of an exception locating apparatus according to an embodiment of this application.

Refer to FIG. 10. An embodiment of this application provides an exception locating apparatus 1000. The apparatus 1000 is applied to the first device provided in any one of the foregoing embodiments, for example, applied to the first device 101 in the network architecture 100 shown in FIG. 1, FIG. 2, FIG. 3, FIG. 5, FIG. 6, FIG. 7, or FIG. 8, or the first device provided in the method 400 shown in FIG. 4, and the apparatus 1000 includes:

a receiving unit 1001, configured to receive a first exception signal, where the first exception signal is a signal that changes abruptly from a first communication signal when the first communication signal passes through a location of an exception on a first line, the first line is a line between the apparatus 1000 and a second device, and the first communication signal is a signal sent by the second device to the apparatus 1000 through a first line, where the receiving unit 1001 is further configured to receive exception alarm information, where the exception alarm information is sent by the second device after the second device receives a second exception signal, the second exception signal is a signal that changes abruptly from a second communication signal when the second communication signal passes through the location of the exception, and the second communication signal is a signal sent by the apparatus 1000 to the second device through the first line; and a processing unit 1002, configured to determine the location of the exception based on a first time interval, where the first time interval is an interval between time at which the first exception signal is received and time at which the exception alarm information is received.

In an embodiment, for a detailed implementation process in which the receiving unit 1001 receives the first exception signal, refer to related content in operation 403 of the method 400 shown in FIG. 4. Details are not described herein.

In an embodiment, for a detailed implementation process in which the receiving unit 1001 receives the exception alarm information, refer to related content in operation 405 of the method 400 shown in FIG. 4. Details are not described herein.

In an embodiment, for a detailed implementation process in which the processing unit 1002 determines the location of the exception, refer to related content in operation 407 of the method 400 shown in FIG. 4. Details are not described herein.

In an embodiment, the processing unit 1002 is configured to determine the location of the exception based on a second time interval and the first time interval. The second time interval indicates an interval between time at which the second device receives the second exception signal and time at which the second device sends the exception alarm information.

In an embodiment, for a detailed implementation process in which the processing unit 1002 determines the location of the exception based on the second time interval and the first time interval, refer to related content in operation 407 of the method 400 shown in FIG. 4. Details are not described herein.

In an embodiment, the processing unit 1002 is configured to determine the location of the exception based on a device internal delay, the first time interval, and the second time interval. The device internal delay includes a delay required by the receiving unit 1001 to receive the first exception signal, a delay required by the second device to receive the second exception signal, a delay required by the second device to send the exception alarm information, and a delay required by the receiving unit 1001 to receive the exception alarm information.

In an embodiment, for a detailed implementation process in which the processing unit 1002 determines the location of the exception based on the device internal delay, the second time interval, and the first time interval, refer to related content in operation 407 of the method 400 shown in FIG. 4. Details are not described herein.

In an embodiment, the apparatus 1000 includes a first clock counter, the second device includes a second clock counter, and the apparatus 1000 is a secondary device of the second device.

The processing unit 1002 is further configured to adjust timing frequency of the first clock counter based on a third communication signal, to enable the timing frequency of the first clock counter to be synchronized with timing frequency of the second clock counter. The third communication signal is sent by the second device based on a working clock of the second clock counter.

In an embodiment, for a detailed implementation process in which the processing unit 1002 adjusts the timing frequency of the first clock counter, refer to related content in operation 402 of the method 400 shown in FIG. 4. Details are not described herein.

In an embodiment, the processing unit 1002 is further configured to determine a primary/secondary relationship between the apparatus 1000 and the second device based on device information of the apparatus 1000 and device information of the second device.

In an embodiment, for a detailed implementation process in which the processing unit 1002 determines the primary/secondary relationship between the apparatus 1000 and the second device, refer to related content in operations 4011 to 4013 in the method 400 shown in FIG. 4. Details are not described herein.

In an embodiment, the second time interval is a specified time interval.

In an embodiment, the apparatus 1000 includes the first clock counter.

The processing unit 1002 is further configured to calculate the first time interval based on a first count value, a second count value, and the timing frequency of the first clock counter. The first count value is a count value of the first clock counter when the receiving unit 1001 receives the first exception signal, and the second count value is a count value of the first clock counter when the receiving unit 1001 receives the exception alarm information.

In an embodiment, for a detailed implementation process in which the processing unit 1002 calculates the first time interval, refer to related content in operation 406 of the method 400 shown in FIG. 4. Details are not described herein.

In an embodiment, the receiving unit 1001 is further configured to receive delay information sent by the second device. The delay information indicates the second time interval.

The processing unit 1002 is further configured to calculate the second time interval based on the delay information.

In an embodiment, for a detailed implementation process in which the processing unit 1002 calculates the second time interval, refer to related content in operation 407 of the method 400 shown in FIG. 4. Details are not described herein.

In an embodiment, the second device includes the second clock counter, and the delay information includes a third count value and a fourth count value, the delay information includes a difference between a third count value and a fourth count value, or the delay information includes the second time interval.

The third count value is a count value of the second clock counter when the second device receives the second exception signal, the fourth count value is a count value of the second clock counter when the second device sends the exception alarm information, and the second time interval is obtained based on the third count value, the fourth count value, and the timing frequency of the second clock counter.

In an embodiment, the receiving unit 1001 is configured to receive a first packet sent by the second device, and a reserved field of the first packet includes the exception alarm information.

In an embodiment, the receiving unit 1001 is configured to receive a code stream sent by the second device, and an idle field of the code stream includes the exception alarm information.

In an embodiment, the receiving unit 1001 is configured to receive a signal from the first line.

The processing unit 1002 is further configured to determine, when detecting that a performance parameter value of the signal exceeds a specified threshold, that the signal is the first exception signal.

In an embodiment, for a detailed implementation process in which the processing unit 1002 determines that the signal is the first exception signal, refer to related content in operation 403 of the method 400 shown in FIG. 4. Details are not described herein.

In an embodiment, a performance parameter of the signal includes at least one of the following: signal power, a signal-to-noise ratio SNR, a polarization-dependent loss PDL, a bit error rate BER, a packet loss rate, and a state of polarization SOP value of the signal.

In this embodiment of this application, the receiving unit receives the first exception signal, and the second device sends the exception alarm information to the first device after receiving the second exception signal. In this way, the receiving unit receives the exception alarm information, the processing unit obtains the first time interval based on the first exception signal and the exception alarm information, and determines the location of the exception based on the first time interval, to quickly determine the location of the exception. This improves exception locating efficiency. When an exception occurs on the first line, the receiving unit receives the first exception signal, and the second device receives the second exception signal. Therefore, when an exception occurs, a location of the exception can be located, to avoid missing detection of the exception that occurs.

Figure 11:
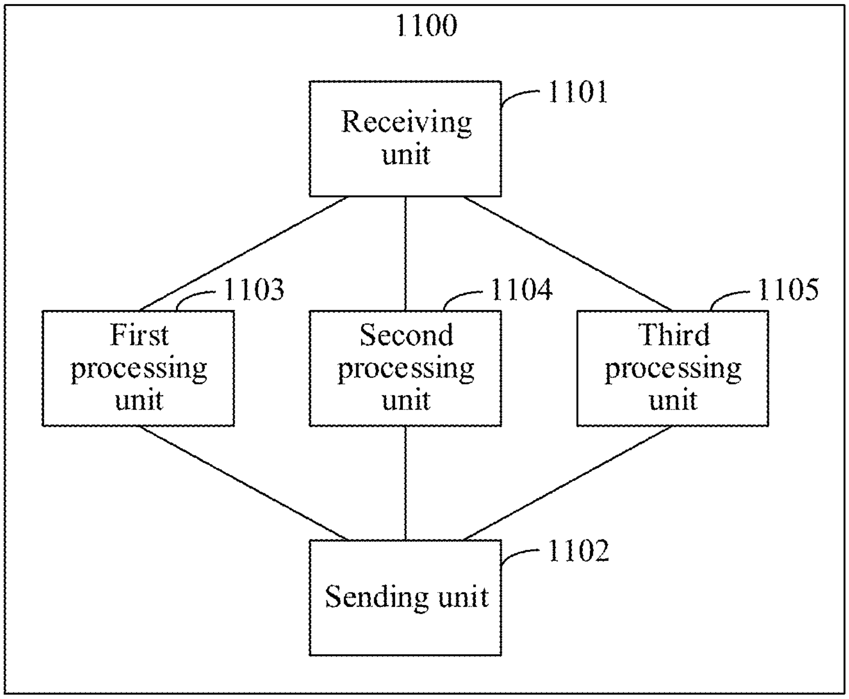
FIG. 11 is a schematic diagram of a structure of another exception locating apparatus according to an embodiment of this application.

Refer to FIG. 11. An embodiment of this application provides an exception locating apparatus 1100. The apparatus 1100 is applied to the second device provided in any one of the foregoing embodiments, for example, applied to the second device 102 in the network architecture 100 shown in FIG. 1, FIG. 2, FIG. 3, FIG. 5, FIG. 6, FIG. 7, or FIG. 8, or the second device provided in the method 400 shown in FIG. 4, and the apparatus 1100 includes:

- a receiving unit 1101, configured to receive a second exception signal, where the second exception signal is a signal that changes abruptly from a second communication signal when the second communication signal passes through a location of an exception on a first line, the first line is a line between a first device and the apparatus 1100, and the second communication signal is a signal sent by the first device to the apparatus 1100 through the first line; and
- a sending unit 1102, configured to send exception alarm information to the first device, where the exception alarm information alarms about the second exception signal, and the exception alarm information is further used to trigger the first device to determine the location of the exception.

In an embodiment, for a detailed implementation process in which the receiving unit 1101 receives the second exception signal, refer to related content in operation 404 of the method 400 shown in FIG. 4. Details are not described herein.

In an embodiment, for a detailed implementation process in which the sending unit 1102 sends the exception alarm information, refer to related content in operation 405 of the method 400 shown in FIG. 4. Details are not described herein.

In an embodiment, the first device includes a first clock counter, the apparatus 1100 includes a second clock counter, the apparatus 1100 is a secondary device of the first device, and the apparatus 1100 further includes:

- a first processing unit 1103, configured to adjust timing frequency of the second clock counter based on a fourth communication signal, to enable the timing frequency of the second clock counter to be synchronized with timing frequency of the first clock counter. The fourth communication signal is sent by the first device based on a working clock of the first clock counter.

In an embodiment, for a detailed implementation process in which the first processing unit 1103 adjusts the timing frequency of the second clock counter, refer to related content in operation 402 of the method 400 shown in FIG. 4. Details are not described herein.

In an embodiment, the first processing unit 1103 is further configured to determine a primary/secondary relationship between the first device and the apparatus 1100 based on device information of the first device and device information of the apparatus.

In an embodiment, for a detailed implementation process in which the first processing unit 1103 determines the primary/secondary relationship, refer to related content in operation 402 of the method 400 shown in FIG. 4. Details are not described herein.

In an embodiment, the sending unit 1102 is further configured to send delay information to the first device. The delay information indicates a second time interval, and the second time interval indicates an interval between time at which the receiving unit 1101 receives the second exception signal and time at which the sending unit 1102 sends the exception alarm information.

In an embodiment, for a detailed implementation process in which the sending unit 1102 sends the delay information to the first device, refer to related content in operation 405 of the method 400 shown in FIG. 4. Details are not described herein.

In an embodiment, the apparatus 1100 includes the second clock counter, and the delay information includes a third count value and a fourth count value, the delay information includes a difference between a third count value and a fourth count value, or the delay information includes the second time interval.

The third count value is a count value of the second clock counter when the receiving unit 1101 receives the second exception signal, the fourth count value is a count value of the second clock counter when the sending unit 1102 sends the exception alarm information, and the second time interval is obtained based on the third count value, the fourth count value, and the timing frequency of the second clock counter.

In an embodiment, the interval between the time at which the receiving unit 1101 receives the second exception signal and the time at which the sending unit 1102 sends the exception alarm information is a specified time interval.

In an embodiment, the sending unit 1102 is configured to send a first packet to the first device, and a reserved field of the first packet includes the exception alarm information.

In an embodiment, the sending unit 1102 is configured to send a code stream to the first device, and an idle field of the code stream includes the exception alarm information.

In an embodiment, the apparatus 1100 further includes:

- a second processing unit 1104, configured to add the exception alarm information to an idle field of at least one to-be-sent code stream frame. The code stream includes the at least one code stream frame.

In an embodiment, for a detailed implementation process in which the second processing unit 1104 adds the exception alarm information, refer to related content in operation 405 of the method 400 shown in FIG. 4. Details are not described herein.

In an embodiment, the apparatus 1100 further includes a third processing unit 1105.

The receiving unit 1101 is configured to receive a signal from the first line.

The third processing unit 1105 is configured to determine, when detecting that a performance parameter value of the signal exceeds a specified threshold, that the signal is the second exception signal.

In an embodiment, for a detailed implementation process in which the third processing unit 1105 determines that the signal is the second exception signal, refer to related content in operation 404 of the method 400 shown in FIG. 4. Details are not described herein.

In an embodiment, a performance parameter of the signal includes at least one of the following: signal power, a signal-to-noise ratio SNR, a polarization-dependent loss PDL, a bit error rate BER, a packet loss rate, and a state of polarization SOP value of the signal.

In this embodiment of this application, the sending unit sends the exception alarm information to the first device after the receiving unit receives the second exception signal. In this way, the first device receives the exception alarm information, obtains a first time interval, and determines the location of the exception based on the first time interval, to quickly determine the location of the exception. This improves exception locating efficiency. When an exception occurs on the first line, the receiving unit receives the second exception signal, and the sending unit sends the exception alarm information to the first device, so that the first device performs exception locating. Therefore, when an exception occurs, a location of the exception can be located, to avoid missing detection of the exception that occurs.

Figure 12:
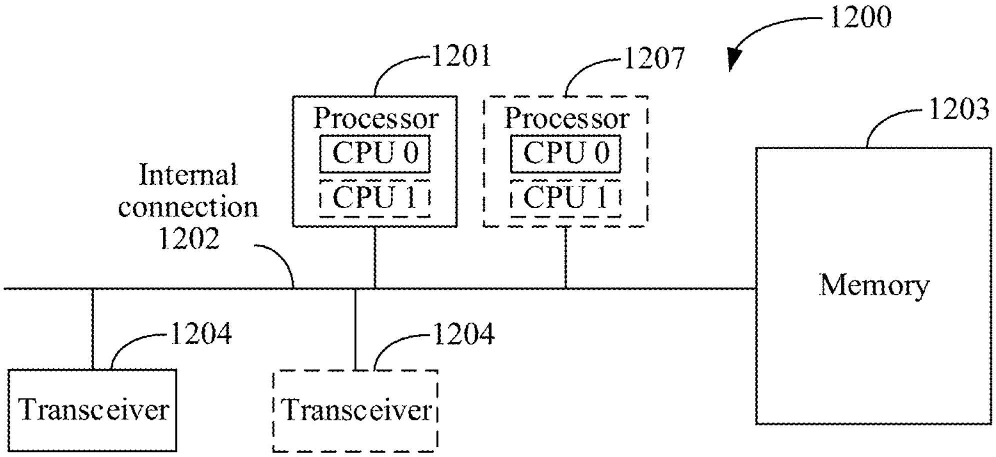
FIG. 12 is a schematic diagram of a structure of another exception locating apparatus according to an embodiment of this application.

FIG. 12 is a schematic diagram of an exception locating apparatus 1200 according to an embodiment of this application. The apparatus 1200 may be the first device in any one of the foregoing embodiments, for example, may be the first device 101 in the network architecture 100 shown in FIG. 1, FIG. 2, FIG. 3, FIG. 5, FIG. 6, FIG. 7, or FIG. 8, or the first device provided in the method 400 shown in FIG. 4. The apparatus 1200 includes at least one processor 1201, an internal connection 1202, a memory 1203, and at least one transceiver 1204.

The apparatus 1200 is an apparatus of a hardware structure, and may be configured to implement functional modules in the apparatus 1000 shown in FIG. 10. For example, a person skilled in the art may figure out that the processing unit 1002 in the apparatus 1000 shown in FIG. 10 may be implemented by the at least one processor 1201 by invoking code in the memory 1203, and the receiving unit 1001 in the apparatus 1000 shown in FIG. 10 may be implemented by the transceiver 1204.

In an embodiment, the apparatus 1200 may be further configured to implement a function of the first device in any one of the foregoing embodiments.

In an embodiment, the processor 1201 may be a general-purpose central processing unit (CPU), a network processor (NP), a microprocessor, an application-specific integrated circuit (ASIC), or one or more integrated circuits configured to control program execution of the solutions of this application.

The internal connection 1202 may include a path for transmitting information between the foregoing components. In an embodiment, the internal connection 1202 is a board, a bus, or the like.

The transceiver 1204 is configured to communicate with another device or a communication network.

The memory 1203 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and is connected to the processor through the bus. Alternatively, the memory may be integrated with the processor.

The memory 1203 is configured to store application program code for executing the solutions of this application, and the processor 1201 controls the execution. The processor 1201 is configured to execute the application program code stored in the memory 1203, and cooperate with the at least one transceiver 1204, so that the apparatus 1200 implements functions in the method in this patent.

During specific implementation, in an embodiment, the processor 1201 may include one or more CPUs, for example, a CPU 0 and a CPU 1 shown in FIG. 12.

During specific implementation, in an embodiment, the apparatus 1200 may include a plurality of processors, for example, the processor 1201 and a processor 1207 shown in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

Figure 13:
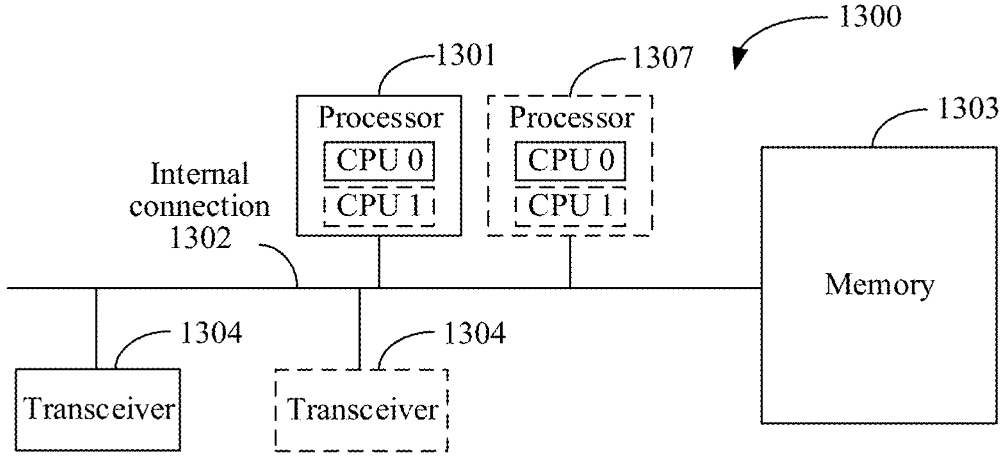
FIG. 13 is a schematic diagram of a structure of another exception locating apparatus according to an embodiment of this application.

FIG. 13 is a schematic diagram of an exception locating apparatus 1300 according to an embodiment of this application. The apparatus 1300 may be the second device in any one of the foregoing embodiments, for example, may be the second device 102 in the network architecture 100 shown in FIG. 1, FIG. 2, FIG. 3, FIG. 5, FIG. 6, FIG. 7, or FIG. 8, or the second device provided in the method 400 shown in FIG. 4. The apparatus 1300 includes at least one processor 1301, an internal connection 1302, a memory 1303, and at least one transceiver 1304.

The apparatus 1300 is an apparatus of a hardware structure, and may be configured to implement functional modules in the apparatus 1100 shown in FIG. 11. For example, a person skilled in the art may figure out that the first processing unit 1103, the second processing unit 1104, and the third processing unit 1105 in the apparatus 1100 shown in FIG. 11 may be implemented by the at least one processor 1301 by invoking code in the memory 1303, and the receiving unit 1101 and the sending unit 1102 in the apparatus 1100 shown in FIG. 11 may be implemented by the transceiver 1304.

In an embodiment, the apparatus 1300 may be further configured to implement a function of the second device in any one of the foregoing embodiments.

In an embodiment, the processor 1301 may be a general-purpose central processing unit (CPU), a network processor (NP), a microprocessor, an application-specific integrated circuit (ASIC), or one or more integrated circuits configured to control program execution of the solutions of this application.

The internal connection 1302 may include a path for transmitting information between the foregoing components. In an embodiment, the internal connection 1302 is a board, a bus, or the like.

The transceiver 1304 is configured to communicate with another device or a communication network.

The memory 1303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and is connected to the processor through the bus. Alternatively, the memory may be integrated with the processor.

The memory 1303 is configured to store application program code for executing the solutions of this application, and the processor 1301 controls the execution. The processor 1301 is configured to execute the application program code stored in the memory 1303, and cooperate with the at least one transceiver 1304, so that the apparatus 1300 implements functions in the method in this patent.

During specific implementation, in an embodiment, the processor 1301 may include one or more CPUs, for example, a CPU 0 and a CPU 1 shown in FIG. 13.

During specific implementation, in an embodiment, the apparatus 1300 may include a plurality of processors, for example, the processor 1301 and a processor 1307 shown in FIG. 13. Each of the processors may be a single-core (single-CPU) processor, or may be a multi-core (multi-CPU) processor. The processor herein may be one or more devices, circuits, and/or processing cores configured to process data (for example, computer program instructions).

Refer to FIG. 1. This application provides an exception locating system 100. The system 100 includes the apparatus 1000 shown in FIG. 10 and the apparatus 1100 shown in FIG. 11, or includes the apparatus 1200 shown in FIG. 12 and the apparatus 1300 shown in FIG. 13.

The apparatus 1000 shown in FIG. 10 or the apparatus 1200 shown in FIG. 12 may be a first device 101, and the apparatus 1100 shown in FIG. 11 or the apparatus 1300 shown in FIG. 13 may be a second device 102.

A person of ordinary skill in the art may understand that all or some of the operations of embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. An exception locating method, comprising:

receiving, by a first device, a first exception signal, wherein the first exception signal is a signal that changes abruptly from a first communication signal when the first communication signal passes through a location of an exception on a first line, the first line is a line between the first device and a second device, and the first communication signal is a signal sent by the second device to the first device through the first line;

receiving, by the first device, exception alarm information, wherein the exception alarm information is sent by the second device after the second device receives a second exception signal, the second exception signal is a signal that changes abruptly from a second communication signal when the second communication signal passes through the location of the exception, and the second communication signal is a signal sent by the first device to the second device through the first line; and determining, by the first device, the location of the exception based on a first time interval, wherein the first time interval is an interval between time at which the first exception signal is received and time at which the exception alarm information is received.

2. The method according to claim 1, wherein the determining, by the first device, the location of the exception based on a first time interval comprises:

determining, by the first device, the location of the exception based on a second time interval and the first time interval, wherein the second time interval indicates an interval between time at which the second device receives the second exception signal and time at which the second device sends the exception alarm information.

3. The method according to claim 2, wherein the determining, by the first device, the location of the exception based on a second time interval and the first time interval comprises:

determining, by the first device, the location of the exception based on a device internal delay, the first time interval, and the second time interval, wherein the device internal delay comprises a delay required by the first device to receive the first exception signal, a delay required by the second device to receive the second exception signal, a delay required by the second device to send the exception alarm information, and a delay required by the first device to receive the exception alarm information.

4. The method according to claim 1, further comprising:

adjusting, by the first device, timing frequency of a first clock counter based on a third communication signal, to enable the timing frequency of the first clock counter to be synchronized with timing frequency of a second clock counter, wherein the third communication signal is sent by the second device based on a working clock of the second clock counter, wherein the first device comprises the first clock counter, the second device comprises the second clock counter, the first device is a secondary device of the second device.

5. The method according to claim 4, further comprising:

determining, by the first device, a primary or a secondary relationship between the first device and the second device based on device information of the first device and device information of the second device.

6. The method according to claim 2, wherein the second time interval is a specified time interval.

7. The method according to claim 1, further comprising:

calculating, by the first device, the first time interval based on a first count value, a second count value, and a timing frequency of a first clock counter, wherein the first count value is a count value of the first clock counter when the first device receives the first exception signal, and the second count value is a count value of the first clock counter when the first device receives the exception alarm information, wherein the first device comprises the first clock counter.

8. The method according to claim 2, further comprising:

receiving, by the first device, delay information sent by the second device, wherein the delay information indicates the second time interval; and calculating, by the first device, the second time interval based on the delay information.

9. The method according to claim 8, wherein the second device comprises a second clock counter, and the delay information comprises a third count value and a fourth count value, the delay information comprises a difference between a third count value and a fourth count value, or the delay information comprises the second time interval, wherein the third count value is a count value of the second clock counter when the second device receives the second exception signal, the fourth count value is a count value of the second clock counter when the second device sends the exception alarm information, and the second time interval is obtained based on the third count value, the fourth count value, and timing frequency of the second clock counter.

10. The method according to claim 1, wherein the receiving, by the first device, exception alarm information comprises:

receiving, by the first device, a first packet sent by the second device, wherein a reserved field of the first packet comprises the exception alarm information.

11. The method according to claim 1, wherein the receiving, by the first device, exception alarm information comprises:

receiving, by the first device, a code stream sent by the second device, wherein an idle field of the code stream comprises the exception alarm information.

12. The method according to claim 1, wherein the receiving, by a first device, a first exception signal comprises:

receiving, by the first device, a signal from the first line; and when detecting that a performance parameter value of the signal exceeds a specified threshold, determining, by the first device, that the signal is the first exception signal.

13. The method according to claim 12, wherein a performance parameter of the signal comprises at least one of the following: signal power, a signal-to-noise ratio SNR, a polarization-dependent loss PDL, a bit error rate BER, a packet loss rate, and a state of polarization SOP value of the signal.

14. An exception locating method, comprising:

receiving, by a second device, a second exception signal, wherein the second exception signal is a signal that changes abruptly from a second communication signal when the second communication signal passes through a location of an exception on a first line, the first line is a line between a first device and the second device, and the second communication signal is a signal sent by the first device to the second device through the first line; and sending, by the second device, exception alarm information to the first device, wherein the exception alarm information alarms about the second exception signal, and the exception alarm information is further used to trigger the first device to determine the location of the exception.

15. The method according to claim 14, further comprising:

adjusting, by the second device, timing frequency of a second clock counter based on a fourth communication signal, to enable the timing frequency of the second clock counter to be synchronized with timing frequency of a first clock counter, wherein the fourth communication signal is sent by the first device based on a working clock of the first clock counter, wherein the first device comprises the first clock counter, the second device comprises the second clock counter, the second device is a secondary device of the first device.

16. The method according to claim 15, further comprising:

determining, by the second device, a primary or a secondary relationship between the first device and the second device based on device information of the first device and device information of the second device.

17. The method according to claim 14, further comprising:

sending, by the second device, delay information to the first device, wherein the delay information indicates a second time interval, and the second time interval indicates an interval between time at which the second device receives the second exception signal and time at which the second device sends the exception alarm information.

18. The method according to claim 17, wherein the second device comprises a second clock counter, and the delay information comprises a third count value and a fourth count value, the delay information comprises a difference between a third count value and a fourth count value, or the delay information comprises the second time interval, wherein the third count value is a count value of the second clock counter when the second device receives the second exception signal, the fourth count value is a count value of the second clock counter when the second device sends the exception alarm information, and the second time interval is obtained based on the third count value, the fourth count value, and a timing frequency of the second clock counter.

19. The method according to claim 14, wherein an interval between time at which the second device receives the second exception signal and time at which the second device sends the exception alarm information is a specified time interval.

20. An exception locating apparatus, wherein the apparatus comprises:

a processor;

a memory storing program instructions, which, when executed by the processor, cause the apparatus to:

receive a first exception signal, wherein the first exception signal is a signal that changes abruptly from a first communication signal when the first communication signal passes through a location of an exception on a first line, the first line is a line between the apparatus and a second device, and the first communication signal is a signal sent by the second device to the apparatus through the first line, wherein receive exception alarm information, wherein the exception alarm information is sent by the second device after the second device receives a second exception signal, the second exception signal is a signal that changes abruptly from a second communication signal when the second communication signal passes through the location of the exception, and the second communication signal is a signal sent by the apparatus to the second device through the first line; and determine the location of the exception based on a first time interval, wherein the first time interval is an interval between time at which the first exception signal is received and time at which the exception alarm information is received.

* * * * *